(12) United States Patent
Roberts

(10) Patent No.: US 7,183,948 B2
(45) Date of Patent: Feb. 27, 2007

(54) TANGENTIAL FORCE CONTROL IN A TOUCH LOCATION DEVICE

(75) Inventor: Jerry B. Roberts, Arlington, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 1157 days.

(21) Appl. No.: 09/835,049

(22) Filed: Apr. 13, 2001

(65) Prior Publication Data

US 2002/0175836 A1 Nov. 28, 2002

(51) Int. Cl.
*H03M 11/00* (2006.01)
(52) U.S. Cl. .......................................... 341/34; 345/173
(58) Field of Classification Search ................. 341/34; 178/20.02, 18.01; 445/3, 30; 345/173, 156, 345/157, 34
See application file for complete search history.

(56) References Cited

U.S. PATENT DOCUMENTS

| | | | |
|---|---|---|---|
| 3,657,475 A | 4/1972 | Peronneau et al. | |
| 4,089,036 A | 5/1978 | Geronime | |
| 4,121,049 A | 10/1978 | Roeber | |
| 4,340,777 A | 7/1982 | DeCosta et al. | |
| 4,355,202 A | 10/1982 | DeCosta et al. | |
| 4,389,711 A | 6/1983 | Hotta et al. | |
| 4,484,179 A | 11/1984 | Kasday | |
| 4,495,434 A | 1/1985 | Diepers et al. | |
| 4,511,760 A | 4/1985 | Garwin et al. | |
| 4,542,375 A | 9/1985 | Alles et al. | |
| 4,550,384 A | 10/1985 | Kimura | |
| 4,558,757 A | 12/1985 | Mori et al. | |
| 4,675,569 A | 6/1987 | Bowman et al. | |
| 4,697,049 A | 9/1987 | Peemoller et al. | |
| 4,745,565 A | 5/1988 | Garwin et al. | |
| 4,771,277 A | 9/1988 | Barbee et al. | |
| 4,775,765 A | 10/1988 | Kimura et al. | |
| 4,816,811 A | 3/1989 | Bogatin et al. | |
| 4,875,378 A | 10/1989 | Yamazaki et al. | |
| 4,893,115 A | 1/1990 | Blanchard | |

(Continued)

FOREIGN PATENT DOCUMENTS

DE 92 03 286.9 6/1792

(Continued)

OTHER PUBLICATIONS

"Force Concentrator For Touch Sensitive Panel Using Snap-Action Switches", IBM Technical Disclosure Bulletin #NN7606238, vol. 19, Jun. 1976.

(Continued)

*Primary Examiner*—Wendy R. Garber
*Assistant Examiner*—Hung Q. Dang
(74) *Attorney, Agent, or Firm*—Robert J. Pechman

(57) ABSTRACT

Various techniques are provided for reducing the impact of tangential forces on touch location in a touch location device. For example, in one aspect, shunt connections are provided that impede lateral motion of the touch surface structure at the level of the touch plane, thereby reducing to insignificant magnitude reactions to tangential force passing through the sensing connections. In another aspect, sensing connections incorporate elastic means so adjusted as to turn that connection's reaction to tangential touch force perpendicular to its axis of sensitivity. In another aspect, sensing connections incorporate sensing means so adjusted as to turn that connection's axis of sensitivity perpendicular to its reaction to tangential force.

44 Claims, 18 Drawing Sheets

U.S. PATENT DOCUMENTS

| | | |
|---|---|---|
| 4,918,262 A | 4/1990 | Flowers et al. |
| 4,983,787 A | 1/1991 | Kunikane |
| 5,038,142 A | 8/1991 | Flowers et al. |
| 5,072,076 A | 12/1991 | Camp, Jr. |
| 5,241,308 A | 8/1993 | Young |
| 5,376,948 A | 12/1994 | Roberts |
| 5,401,916 A | 3/1995 | Crooks |
| 5,541,372 A | 7/1996 | Baller et al. |
| 5,543,588 A | 8/1996 | Bisset et al. |
| 5,563,632 A | 10/1996 | Roberts |
| 5,565,657 A * | 10/1996 | Merz .................... 178/18.01 |
| 5,708,460 A | 1/1998 | Young et al. |
| 5,714,694 A | 2/1998 | Diessner |
| 5,854,625 A | 12/1998 | Frisch et al. |
| 6,108,211 A | 8/2000 | Diessner |
| 6,388,655 B1 * | 5/2002 | Leung ....................... 345/157 |
| 6,633,746 B1 * | 10/2003 | Walsh et al. ............... 340/7.55 |

FOREIGN PATENT DOCUMENTS

| | | |
|---|---|---|
| EP | 0531815 | 3/1993 |
| GB | 2 180 342 | 3/1987 |
| JP | 61148522 | 7/1986 |
| WO | 99/48043 | 9/1999 |

OTHER PUBLICATIONS

"Touch-Sensitive Pancake," IBM Technical Disclosure Bulletin #88A61790, Oct. 1998.

* cited by examiner

TANGENTIAL FORCE CONTROL IN A TOUCH LOCATION DEVICE

CROSS REFERENCE TO RELATED APPLICATIONS

This application is related to concurrently filed and commonly owned patent application entitled "Method and Apparatus for Force-Based Touch Input," hereby incorporated by reference in its entirety.

BACKGROUND

1. Field of the Invention

The present invention relates to touch sensors and, more particularly, to force sensing touch location devices for accurately locating touch forces that include tangential force components.

2. Related Art

The ability to sense and measure and/or locate a force applied to a surface is useful in a variety of contexts. As a result, various systems have been developed in which force sensors are used to measure properties of a force (referred to herein as a "touch force") applied to a surface (referred to herein as a "touch surface"). In response to the touch force, force sensors typically generate signals that may be used, for example, to locate the position on the touch surface at which the touch force was applied. A number of particular implementations of this approach have been proposed, such as that described by Peronneau et al. in U.S. Pat. No. 3,657,475.

Such touch location is of particular interest when the touch surface is that of a computer display, or that of a transparent overlay in front of a computer display. Furthermore, there is an increasing need for small, lightweight, and inexpensive touch location devices due to the proliferation of mobile and handheld devices, such as personal digital assistants (PDAs). Such touch location devices may be built with touch sensors based on a number of possible technologies, such as the force principle just mentioned, as well as capacitive, resistive, acoustic, and infrared technologies. Various features of prior art touch location devices and of force-based touch location in general are described in more detail in the commonly owned and concurrently filed patent application entitled "Method and Apparatus for Force-Based Touch Input."

One problem with conventional touch location devices is that they typically misreport the location of touches that are not applied straight against the touch surface. In other words, if a user touches a touch surface with a finger or a stylus applying force at an angle other than 90 degrees to the touch surface, the location of the touch is typically misreported. The force applied by such an "angled touch" includes two force components: a component that is perpendicular to the touch surface (the "perpendicular component") and a component that is parallel to the touch surface (the "tangential component"). Misreporting of the touch location is typically caused by the effects of the tangential force component that are sensed by one or more force sensors in the touch location device. Tangential force components of a touch force are also referred to herein simply as "tangential forces."

For example, tangential forces may be transmitted to a sensor through a supporting sensor attachment, even though the sensor is not intended to measure such tangential forces. A pattern of forces and moments required to maintain equilibrium will be generated within the touch device by the tangential force, and aspects of this pattern may tend to pass in combination through any sensor that transmits portions of the tangential force itself. Errors in touch location may occur if the force sensor is sensitive to this combination.

Various solutions have been proposed to the errors introduced by tangential forces. For example, some systems place the force sensors somewhat behind the touch surface and simply tolerate the resulting error caused by tangential forces. Another approach has been to physically place all of the relevant touch-sensitive structure (e.g., force sensors and sensor assemblies) close to the touch surface, thereby reducing the impact of tangential forces.

Another approach has been to place explicit pivots in the touch plane for each force sensor support, as disclosed in DeCosta, U.S. Pat. No. 4,355,202, entitled "Mounting Arrangement for a Position Locating System." Yet another approach has been to measure additional degrees of freedom of the touch force, such that the tangential component of the touch force may be corrected for, as disclosed in Roberts, U.S. Pat. No. 5,376,948, entitled "Method of and Apparatus for Touch-Input Computer and Related Display Employing Touch Force Location External to the Display."

All of these prior art approaches have drawbacks. Ignoring tangential error may be unsatisfactory in precision applications, such as handwriting recognition, even when rearward sensor displacement is no more than the thickness of a 1 mm overlay. Removing tangential error by placing the sensors in the plane of touch may be unsatisfactory for reasons of device width and thickness. Pivoting the force transmission in the plane of touch, as disclosed by DeCosta, limits tangential error, but fails to address device width and thickness problems. Measuring all degrees of freedom, as disclosed in Roberts, limits tangential error, but requires additional space and additional complexity somewhere within the device.

Thus it is seen that the prior art fails to teach how force sensors may be located behind the plane of touch without either excessive error, excessive bulk, or excessive cost. Because angled touches (i.e., touch forces having non-zero tangential components) may occur frequently in a variety of applications, it is desirable that the location of touch on the touch surface be reported accurately by the touch location device, even if the touch is applied at an angle. Furthermore, it is desirable for such accurate location of angled touches to be achieved in conjunction with both planar and non-planar touch surfaces and using a variety of kinds of force sensors.

SUMMARY

Applying a tangential force to a touch surface produces reaction forces in the supporting connections. These reactions are not each simply equal and opposite to some fraction of the applied tangential force. Rather, the reaction in each supporting connection is a complete force pattern, combining three degrees of translational force and three degrees of moment. When combined in application to the touch surface structure, these force patterns cancel out in most respects, leaving only the equal and opposite reaction to the applied force. Thus, the reaction to a tangential force in a sensing connection may itself have a line of action inclined to the touch plane, with the corresponding perpendicular force component producing unwanted output in the corresponding sensor.

Various aspects of the invention provide techniques for reducing sensor response to this sensing-connection reaction, including techniques for reducing the total sensing connection reaction, turning its force to hit the sensor "edge-on", and turning the sensor to catch the force "edge-on". Thus if the reaction force passing through a sensor connection, in response to a pure tangential force applied in the touch surface, either has insignificant magnitude, or passes through that connection at right angles to its axis of force sensitivity, then the associated sensor will generate no response. If such a relation is maintained for all sensors, and all positions and directions of tangential force applied in the touch surface, then the touch location device will have a plane of accuracy coincident with its touch surface, and will not suffer touch location errors due to tangential components of applied touch force. Various aspects of the present invention provide techniques for establishing such a relation.

For example, in a first "divided paths" aspect of the invention, shunt connections may impede lateral motion of the touch surface structure at the level of the touch plane, and thereby reduce to insignificant magnitude reactions to tangential force passing through the sensing connections.

In a second "elastic correction" aspect of the invention, sensing connections may incorporate elastic means so adjusted as to turn that connection's reaction to tangential touch force perpendicular to its axis of sensitivity. In most members of this family, multiple sensor connections each provide a single force signal. In one member, however, a set of displacement sensors detects perpendicular motions of portions of a rigid touch surface structure, effectively yielding a single, multiple-output sensing connection.

In a third "angled sensor" aspect of the invention, sensing connections may incorporate sensing means so adjusted as to turn that connection's axis of sensitivity perpendicular to its reaction to tangential force. In various embodiments of this aspect of the present invention, multiple sensor connections each provide a single force signal. In at least one embodiment, however, a set of displacement sensors detects oblique motions of portions of a rigid touch surface structure, effectively yielding a single, multiple-output sensing connection. Each sensor is then perpendicular to the displacement it experiences in reaction to tangential force.

In the divided paths aspect of the present invention, shunt connections provide a novel second set of force paths, whereas in the second and third aspects of the present invention, substantially all touch force may pass through the sensing connections. In the elastic correction aspect of the present invention, and in some embodiments of the other two aspects of the present invention, elastic means removed from the plane of touch may control the position of the plane of accuracy. In the angled sensor aspect of the present invention, axes of sensor sensitivity will generally lie at an oblique angle to the touch plane normal, whereas in the first two aspects of the present invention, axes of sensor sensitivity may be perpendicular to the touch plane normal. Various embodiments of the present invention may employ, in the connections, elastic elements or subassemblies having an axis of principal stiffness placed at an oblique angle to the touch plane normal.

In yet another aspect of the invention, a lateral softening means may be employed within one or more sensor connections, to reduce the transmission of unmeasured components of force. This may aid in the effective application of other aspects of the invention, and may reduce exposure of force sensors to unnecessary stress.

In yet another aspect of the invention, a rotational softening means may be employed within one or more sensor connections, to reduce the transmission of unmeasured components of moment. Such unmeasured components of moment may contribute to touch location error, as they should be represented in the relevant moment equations. They are most likely to be both significant in magnitude, and unpredictable in character, when produced by a nearby touch flexing the touch surface structure. Rotational softening, especially when located close to the associated force sensor, may also reduce the exposure of that sensor to unnecessary stress.

In the divided path aspect of the invention, shunt connections may constitute a lateral stiffening means, dividing applied touch forces along two sets of force paths, one passing through the sensing connections, and one passing through the shunt connections. The shunt connections impede lateral motion of the touch surface structure at the level of the touch plane, and may thereby reduce to insignificant magnitude force transmitted through the sensing connections in response to tangential components of touch force. Sensor connections may be supplied with lateral softening means to enhance this effect. The shunt connections may be made perpendicularly soft, so as to divert the least amount of perpendicular touch force from the sensing connections. The shunt connections may also be sufficiently soft in rotation, such that essentially all resistance to rotation about axes in the touch plane is an expression of the perpendicular stiffness of the sensor connections. Since this last condition is readily met when the others are met, no special provisions may be required.

Lateral stiffening means used in various embodiments of the present invention may have a plane of effect, which plane may be parallel to the touch surface of the touch device, and within which tangential forces may be received by the lateral stiffening means without rotation of the touch surface being produced by a lack of moment equilibrium. More precisely, imagine that a touch surface structure is made perfectly rigid, and that all connections to it are then removed except for those of the lateral stiffening means. If the plane of effect lies in the touch surface, a tangential force may now be applied, and equilibrium maintained without rotation of the touch surface. If the plane of effect is spaced away from the touch surface, a tangential test force may be applied within the plane of effect through a rigid extension taken from the touch surface, and there will again be no rotation of the touch surface. On the other hand, to maintain equilibrium without rotation, a tangential force in the plane of touch would need to be combined with a moment equal to the product of that tangential force times the distance from the touch plane to the plane of effect. The plane of effect may thus be taken to be the plane of substantially zero reaction moment to the tangential component of the touch force.

Embodiments of the divided path aspect of the present invention may be divided into two types in accordance with a first distinction:

The shunt connections may be so stiff laterally compared to the sensing connections, that the latter are essentially undisturbed by tangential components of touch force, and pass neither force nor moment reactions to the touch surface structure. In this case, the plane of effect may be coincident with both the plane of accuracy and the touch surface.

The sensing connections may pass a significant reaction to tangential force. This reaction is brought horizontal by countervailing adjustments in the lateral stiffening means. In this case, and as an expression of these adjustments, the plane of effect of the lateral stiffening means may be positioned somewhat to the other side of the touch surface from the sensor connections. Thus the moments generated in reaction to a tangential force in both the lateral stiffening means and the sensor connections may now cancel in the plane of touch.

Embodiments of the divided path aspect of the present invention may also be divided into two types in accordance with a second distinction:

Both the lateral stiffening means itself, and its plane of effect, may be essentially within the plane of touch, and the support structure beyond and below may be viewed as rigid. The shunt connections comprising the lateral stiffening means may be stiffer than some minimum laterally, and softer than some minimum perpendicularly, but need not otherwise follow Hooke's law or have predictable stiffness.

Lateral stiffening means may include elastic means below and/or above the plane of touch. Elements of these elastic means may have an oblique principal axis of stiffness. In some cases employing oblique stiffness, the plane of effect may be removed entirely above, or entirely below, the elastic means and shunt connections constituting the lateral stiffening means.

In the elastic correction aspect of the invention, touch forces may be passed exclusively through specially adapted sensing connections. In a first embodiment, such adaptation comprises inclusion of elastic correction means connected in series with the force sensor. The force sensor may be placed below the plane of accuracy, with force passing from the touch surface structure through the elastic correction means, which may be distributed least in part away from the plane of accuracy, then through the force sensor, which may be of a fairly rigid type, and then into the supporting structure. The order of sensor and elastic components may be varied, as is convenient.

In a second embodiment, a set of displacement sensors detects perpendicular motions of portions of a rigid touch surface structure, effectively yielding a single, multiple-output sensing connection.

Embodiments of the elastic correction aspect of the present invention may be divided into three types:

Elastic correction means may be disposed above and below the plane of accuracy, with forces in a sensor connection passing first through one and then through the other. Offsetting flexures above and below the desired plane of accuracy place the elastic center of the associated sensor connection within that desired plane of accuracy.

Elastic correction means may be disposed entirely below (or above) the plane of accuracy. Elastic elements with oblique principal axes of stiffness may serve to project the elastic center of the associated sensor connection into the desired plane of accuracy.

Elastic correction means may be disposed entirely below (or above) the plane of accuracy. Elastic connections with oblique principal axes of stiffness may serve to project the elastic center of the entire touch surface structure into the desired plane of accuracy. Sensors are not connected in series with the elastic means, but comprise displacement sensors that detect motion between the touch surface structure and the support structure.

In the angled sensor aspect of the invention, touch forces may be passed exclusively through specially adapted sensing connections. In a first case, such adaptation comprises an angling of each sensor such that its axis of sensitivity falls at right angles to the reaction forces resulting from either component of tangential force. A modest degree of lateral softening may be provided to prevent the angling of laterally stiff sensors from inhibiting perpendicular motions necessary to sensitivity. If the sensor connections have elastic centers in known locations, as may be the case where a rotational softener is provided, a simple rule may describe the angling appropriate to place the plane of accuracy coincident with the plane of touch.

In a second case, a set of displacement sensors detects oblique motions of portions of a rigid touch surface structure with respect to the support structure, effectively yielding a single, multiple-output sensing connection. Elastic connections with orthogonally aligned principal axes of stiffness may have elastic centers below the plane of accuracy. If the elastic connections have elastic centers in known locations, as may be the case where a rotational softener is provided, a simple rule may describe the displacement sensor angles that place the plane of accuracy coincident with the plane of touch.

Other features and advantages of various embodiments of the present invention will become apparent from the following description and from the claims.

DETAILED DESCRIPTION

Figure 1A:
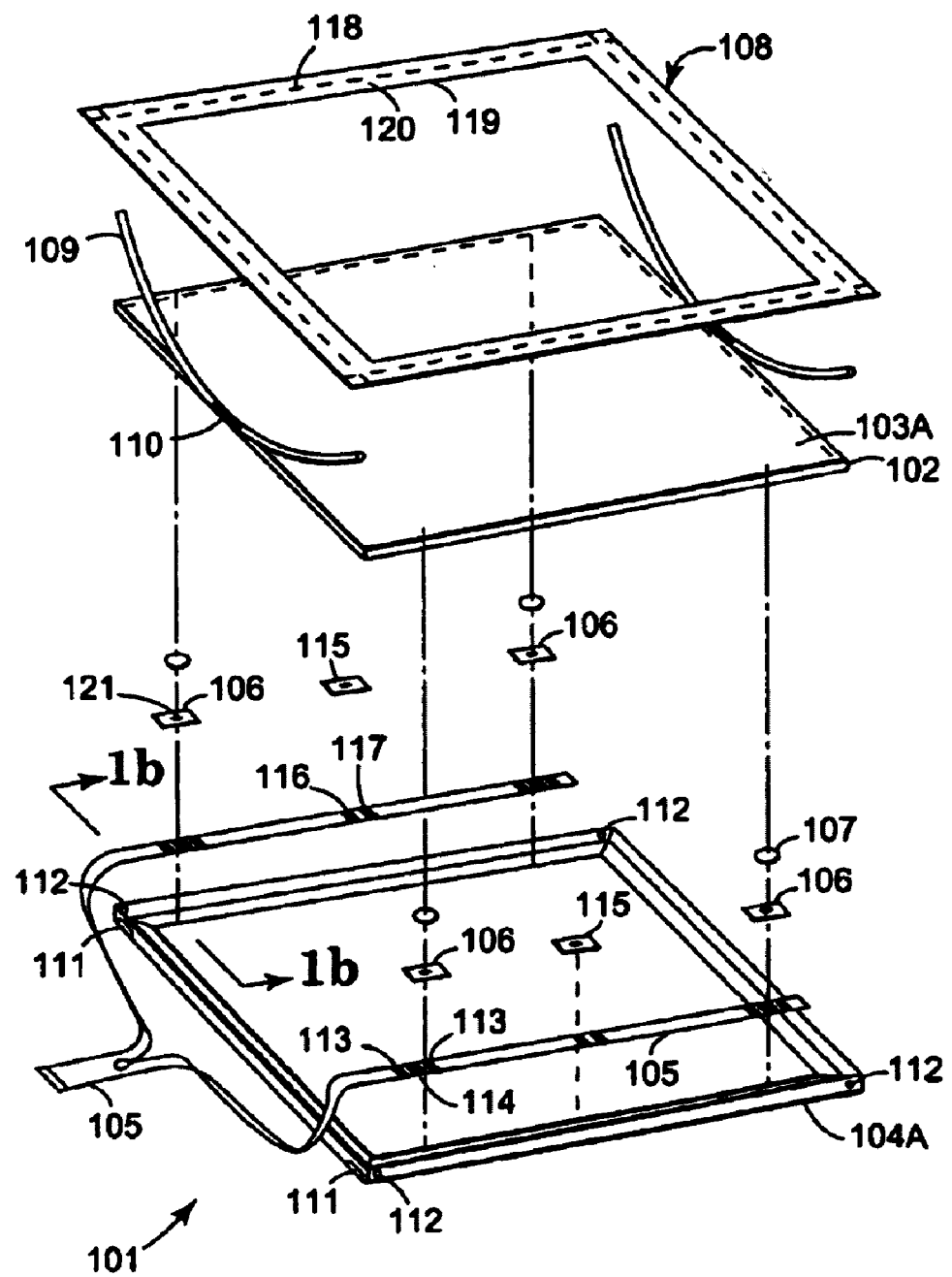
FIG. 1A is an exploded drawing of a touch screen module of a first embodiment of the present invention, as might be used against the face of a separate LCD module.

Before describing various aspects and embodiments of the present invention, some relevant terms will be defined.

Planar, force-based touch location may be performed by developing representations for three of the six degrees of freedom of rigid motion of a solid body presenting a touch surface, which body will be referred to herein as a touch surface structure, or for brevity, a touch panel. Two of these three degrees of freedom represent torques, or moments, about certain axes in three-dimensional space. For greatest accuracy, these axes should intersect: the plane containing these intersecting axes defines the plane of accuracy for touch location. The third degree of freedom represented is the magnitude of force applied perpendicularly to the plane of accuracy. When a touch is applied, the magnitude of the first moment, divided by this perpendicular force, is taken as the distance from the touch point to the first axis. Similarly, the ratio of the second moment to the force is taken as the distance of the touch point from the second axis. The three degrees of freedom that are monitored in this manner to locate the touch point may be termed the relevant degrees of freedom.

A touch may apply tangential forces that are parallel to the plane of accuracy. If these tangential forces are applied above or below the plane of accuracy they will create moments about one or both measurement axes, leading to errors in touch location. Thus for best accuracy, the physical touch surface should be both planar and coincident with the plane of accuracy, although this is not a requirement of the present invention.

Tangential force applied parallel to the first moment axis, tangential force applied parallel to the second moment axis, and moment applied around an axis perpendicular to the plane of accuracy, constitute the three degrees of freedom of rigid motion which are not represented for the purpose of touch computation. If any of these non-relevant degrees of freedom are allowed to affect the monitored representations, the touch location device will be prone to error.

With at least six force sensors, is possible to measure all six degrees of freedom of rigid motion of a solid touch surface. From a representation of all six degrees, it is possible to generate the linear combinations of these that monitor the three degrees relevant to any desired plane of accuracy, regardless of the positioning of the sensors relative to such plane. See, for example, the discussion in U.S. Pat. No. 5,376,948 to Roberts, entitled "Method of and Apparatus for Touch-Input Computer and Related Display Employing Touch Force Location External to the Display."

Alternatively, three or more force sensors may be used, with all sensors together representing only three degrees of freedom of rigid motion. Such systems may be preferred to six-degree systems for reasons of simplicity. The sensors may be fewer than six, may all be oriented in the same direction, and may be placed around the periphery of a planar touch surface, supporting it. The three degrees of freedom to be monitored may again be generated as three different linear combinations of the various force sensor outputs. At best, these three degrees may correspond to some specific plane of accuracy, that plane being determined by the physical touch structure and the positioning of the sensors. Considerable care must be taken, however, to assure that the structure and arrangement chosen yield a good plane of accuracy, and that this is sufficiently coincident with the touch surface.

A force based touch system in which the raw sensor outputs are intended collectively to encode only three degrees of freedom of rigid motion may be termed a three-degree system.

Thus it is seen that the plane of accuracy of a three-degree system is a structural property of that system. Since a real system will have some degree of imperfection, the term plane of accuracy, when applied to the behavior of a real device, may be taken to be that plane with respect to which tangential forces produce the least average error.

It may be noted that three-degree systems may incorporate more than three force sensors, and most commonly use four. As commonly arranged at the corners of a rectangle, such sensors collectively represent a fourth degree of freedom, corresponding to the difference in torsional, or saddling, distortion between the touch surface structure and the support structure. In general, additional sensors in a three-degree system do not capture additional degrees of freedom of rigid motion, but rather, degrees of freedom of internal structural distortion.

Unlike six-degree systems, three-degree systems inherently have a surface of accuracy that is planar. Thus a three-degree system supporting a non-planar touch surface must be prone to some degree of error. These systems may still be quite useful if, for example, the touch surface nowhere deviates too much from its best planar approximation. Such a best planar approximation, indefinitely extended, may be termed the touch plane. Descriptions herein drawn with regard to planar touch surfaces should be understood as extending in this fashion to the non-planar case. Common non-planar surfaces may closely approximate portions of a sphere, cylinder, paraboloid, intersecting cylinders, etc.

In considering orientation of components of a touch-locating device with respect to the touch surface, a natural reference is to the local touch surface normal, which is taken to pass through the component in question, and also passes at right angles through the natural extension of the most natural smooth surface approximating the physical touch surface. Components may sometimes be aligned with respect to the local touch surface normal as a matter of constructional convenience. It will be seen, however, that in embodiments of the invention including components or assemblies having properties that are oblique with respect to the touch plane normal, such properties may also be oblique with respect to the local touch surface normal.

A solid body passing forces from one part of an apparatus to another constitutes a connection. The total force passing through it may be characterized by six numbers. Three of these may represent the magnitudes of three orthogonal components of translational force. The other three may represent the magnitudes of three components of torque or moment, taken about a set of three orthogonal reference axes. These reference axes must be located in space, and may be taken to intersect at a common reference point. The moment values found depend upon the location of the reference point. In particular, there is a locus of possible reference points in space forming a straight line, along which the vector magnitude of the moment is a common minimal value. This locus is referred to herein as the line of action of the total force passing through the connection. Specifically, the magnitudes of moment about axes perpendicular to the line of action are zero when referred to points along the line of action.

A solid body may be considered rigid for purposes of a given problem, if its flexure is small enough to ignore. It will be termed elastic, if it exhibits significant flexure but follows Hooke's law to close enough approximation. An elastic connection is one exhibiting significant elastic flexure from one end region to another overall, and such that the effects on the containing structure may be described in terms of six degrees of translational and rotational displacement of the one end region with respect to the other. Such an elastic connection may exhibit an elastic center, which approximates a common center with respect to which the ends rotate in response to passing various pure moment couples through the connection. Purely translational displacements tend to produce forces with lines of action passing through this elastic center. An elastic connection may exhibit a direction of greatest stiffness when tested with various purely translational displacements; this stiffness is the connection's greatest principal stiffness. A direction and value of least principal stiffness will be found at right angles to the direction of greatest stiffness, and an intermediate principal stiffness will apply along a third direction at right angles to the other two. The axes of principal stiffness are the three lines passing through the elastic center in the directions exhibiting the principal stiffnesses. A pure translational displacement in a principal direction produces a force with a line of action parallel to the displacement; this condition may also be used to find the principal directions. In common degenerate cases, two, or much less commonly, all three principal stiffnesses may have the same value. A pure translational displacement which is oblique to a pair of non-degenerate principal directions produces a force with a line of action oblique to the displacement; the component transverse to the displacement is referred to herein as a jam force.

In the context of a force sensing touch location device, various mechanical connections may pass significant force between the touch surface structure and the surrounding support structure. These may include force sensing connections, seals, lateral stiffening means, force preload means, and others. Of particular interest are those that may pass any appreciable portion of the additional force applied by an operating touch. These connections are referred to herein as sensing connections, where a force sensor is present to monitor some significant component of the force transmitted, and they are referred to herein as shunt connections were no such sensor is present. If a shunt connection passes forces that affect reported touch location, it is said to offer a parasitic force path.

A force sensing connection has a direction of sensitivity, such that a translational force of given magnitude creates greatest output when applied in that direction, and no output when applied at right angles to that direction. A displacement sensor has an analogous direction of sensitivity with respect to applied pure translational displacements. A force sensing connection is said herein to have an axis of sensitivity that passes through its elastic center in its direction of sensitivity. A displacement sensor may be taken to have an axis of sensitivity lying in its direction of sensitivity, and so located that relative rotation of the two sides about points in the axis tend to produce no output.

Tangential force error is associated with a tolerable zone of offset for the plane of accuracy in a touch location device. For example, referring to FIG. 6A, a conventional touch location device 900 is shown in schematic cross-section. The system 900 includes a touch panel 902 having a planar touch surface 904. Conventional touch location devices, such as the device 900, may misreport the location of touches that are not applied purely along a normal 910 to the touch surface 904 (i.e., if the angle θ is not equal to zero). One aspect of this error will now be described in more detail.

Force-based touch devices, such as the device 900, have a surface of accuracy 906 that is usually planar. Note that surface of accuracy 906 need not, and in the case of tangential force sensitivity, typically does not, correspond to any physical surface. Although, for purposes of simplicity of illustration, force sensors are not shown in FIG. 6A, prior art touch device 900 typically includes force sensors, with the surface of accuracy 906 tending to be biased toward the location of such force sensors.

Figure 6A:
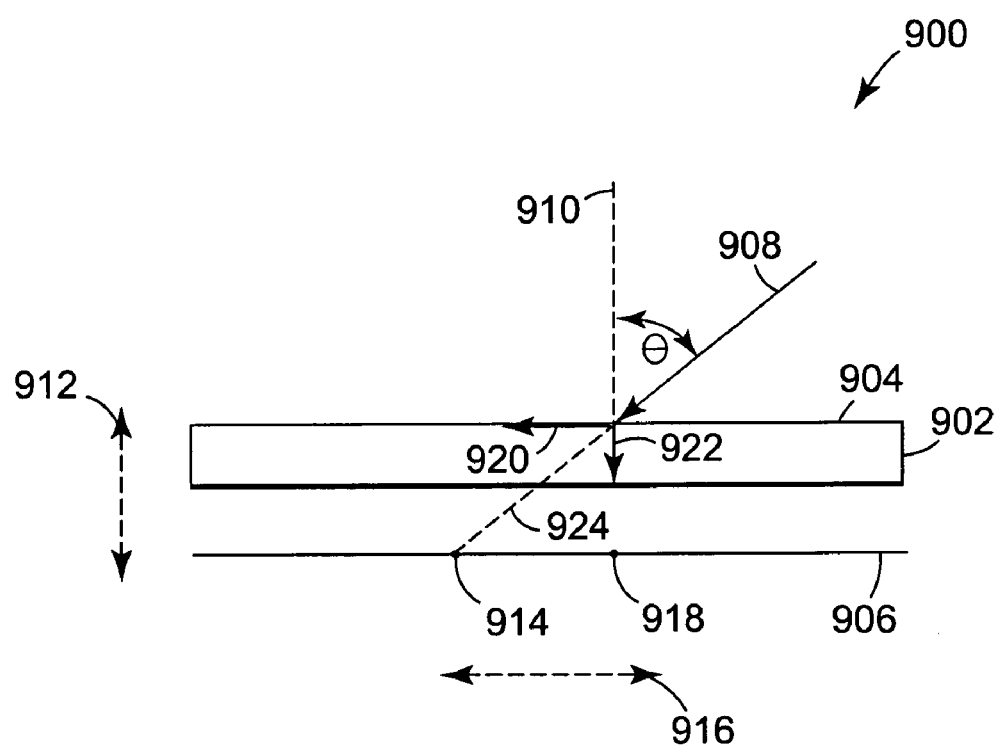
FIG. 6A is a schematic cross-sectional view of a prior art touch-location device.

As shown in FIG. 6A, the surface of accuracy 906 is offset from the touch surface 904 by offset 912. Assume for purposes of example that the offset 912 is 0.25 inches. A touch force 908 is applied to the touch surface 904. The touch force 908 is inclined at θ=45 degrees to the normal 910 of touch surface 904. The line of action 924 defined by the touch force 908 will, therefore, intersect the plane of accuracy 906 at a point 914 that is an error distance 916 (in this case, 0.25 inches) away from the point 918 that it would intersect if the touch force 908 were directed straight inward (i.e., purely along the normal 910 to the touch surface 904). If the touch device 900 is calibrated correctly for straight touches, it will report the location of the (angled) touch force 908 with an error equal to the error distance 916 (i.e., 0.25 inches).

As shown in FIG. 6A, the touch force 908 has both a component 922 that is normal to the touch plane 904 (the "perpendicular component") and a component 920 that is parallel to the touch plane 104 (the "tangential component"). In many applications, the typical tangential component of a touch force is about one-third the magnitude of the touch force's perpendicular component. If, in such an application, the tolerable typical contribution to computed touch position error (i.e., the maximum acceptable error distance 916) is d, then the tolerable offset 912 of the plane of accuracy 906 from the touch surface 904 is plus or minus 3d. Each application therefore has a "tolerable zone of offset" defining a functional thickness of the touch plane, within which the surface of accuracy 906 may be placed without resulting in an unacceptable degree of error in touch location computation.

Various embodiments of the present invention provide techniques for placing the plane of accuracy within a chosen maximum offset from the touch plane. Such a maximum offset may be chosen in any manner based on the degree of touch location accuracy desired.

Various aspects and embodiments of the present invention are presented herein in terms of designs that are designed to give no response to one orthogonally aligned, centrally applied component of tangential force. In most cases, showing that a design that has this characteristic is equivalent to showing that there will be no system response to any non-relevant degrees of freedom of applied force.

First, consider that the techniques for eliminating sensitivity to one such component of centrally applied tangential force may be applied to the other tangential component perpendicular to it. Then, by superposition, the system will not be sensitive to (i.e., will produce no output in response to) tangential forces centrally applied in any direction.

Second, it can be shown that a three-degree system will not respond to perpendicular moment if it possesses at least one plane of bilateral symmetry, combined with any degree of rotational symmetry. The typical rectangular arrangement of sensors, for instance, is functionally symmetrical bilaterally about two planes, and also shows (necessarily) two-fold rotational symmetry. As a matter of practice, most arrangements that might be contemplated will show little system response to a pure perpendicular moment. Note that in some cases there may be sensor response, but this cancels out in the linear combinations used in touch location computation.

A tangential force anywhere in the touch plane can be represented as a combination of a centrally applied tangential force and a perpendicular moment. Thus it follows, from a second application of superposition, that eliminating errors from orthogonal components of centrally applied tangential force may eliminate errors from any tangential force.

In one embodiment of the present invention, the impact of tangential forces on touch location measurement by a touch location device is mitigated as follows. The touch location device includes a touch surface, which may be planar. Lateral stiffening means is provided that is stiff in a direction substantially parallel to the touch surface and compliant in a direction perpendicular to the touch surface. The lateral stiffening means lies within the tolerable zone of offset of the touch surface and is attached to the touch surface to receive tangential forces from the touch surface and to transmit the tangential forces away from the force sensors.

Although the lateral stiffening means may be given appropriate properties by locating it in or symmetrically about the plane of touch, this is not the only way of doing so. For example, properly structured, a lateral stiffening means which is out of the plane of touch may still exhibit an elastic center which is in the plane of touch—that is, it may respond to a tangential force applied in the plane of touch without rotation.

The lateral stiffening means, possibly along with other structure within the touch location device, provides a first force path through which tangential forces may travel. This force path does not include the force sensors. Perpendicular forces travel through a second force path that includes the force sensors. Force measurements are thereby not influenced by the tangential forces, since such forces are not transmitted through the force sensors.

Figure 1B:
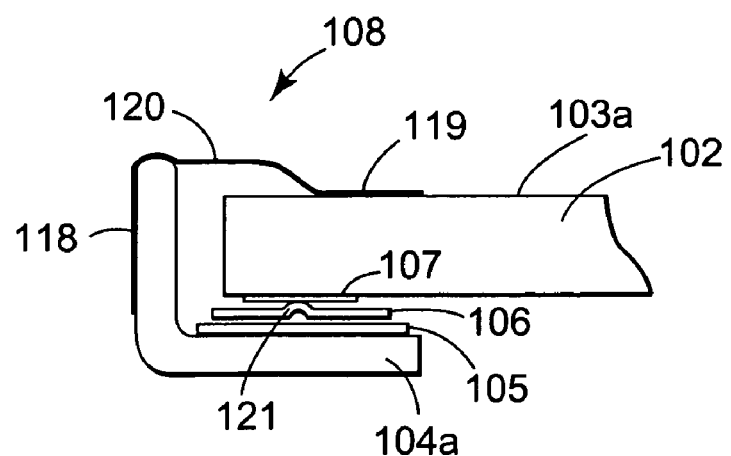
FIG. 1B is a partial cross-section of the module of FIG. 1A, intersecting the center of a sensor.

Referring to FIGS. 1A–1B, a touch sensitive transparent overlay module 101 including lateral stiffening means according to one embodiment of the invention is shown. The module 101 may be used to sense touches applied by, for example, a finger, stylus, or other object. As described in more detail below, in various embodiments of the present invention, the module 101 may be used to sense properties of a touch force applied to a touch surface, such as the location at which the touch force is applied to the touch surface and/or the magnitude of a component of the touch force that is perpendicular to the touch surface. Various aspects of the overlay module 101 are described in more detail in the concurrently filed application entitled "Method and Apparatus for Force-Based Touch Input."

The transparent overlay module 101 is proportioned as might be appropriate for use on an LCD display with a diagonal of 4 inches, though proportions and variations for other displays of other sizes will be apparent to those of ordinary skill in the art. Transparent panel 102, carrying touch surface 103a, rests within frame 104a. Captured between panel 102 and frame 104a are interconnect flex print 105, force sensor principal elements 106, and lateral softening means 107. Preload springs 109 are fastened to the edges of panel 102 with cement 110. The ends of springs 109 engage holes 112 in frame 104a when assembled, thereby applying a total compression of approximately two pounds to the structures captured between panel 102 and frame 104a. The flexed positions of springs 109, as assembled, place them in straight lines along the short edges of panel 102. Combination lateral stiffening means and liquid/dust seal 108 adheres to panel 102 and to the outer surfaces of the vertical flanges of frame 104a, thereby securely centering panel 102 within frame 104a. When so centered, there is a small space between the long sides of panel 102 and frame 104a, and there is a small space around the nonattached portions of springs 109. Thus forces applied to touch surface 103a can produce small perpendicular motions of panel 102 without occasioning interference or scraping around its edges.

Lateral stiffening means 108 may comprise, for example, a polyester or polyimide film, 0.001 to 0.002 in. thick, with acrylic adhesive on the under surface in two areas where attachment is desired. The first such adhesive area 118 lies along the outer portion of 108 beyond the dashed line, which portion folds down over the vertical flanges of frame 104a. The second adhesive area 119 lies in a strip about 1/16 in. wide around the inner edge of 108. This area adheres to touch surface 103a slightly in from the edge of panel 102. The stress in lateral stiffening means 108, when bent along the dashed line, may be relieved, and lateral stiffening means 108 may thereby be given a proper final contour, by a simple thermoforming operation. This may be performed either before or after assembly. The excess material at the external corners of lateral stiffening means 108 may be folded along the diagonal, and laid over to the side against the vertical flange of the frame 104a. The suitable breadth of the freely flexing region 120 of lateral stiffening means 108 depends upon its own stiffness, upon the stiffness of panel 102, and upon the accuracy required. It may, for example, be in the range of 0.060 to 0.120 in. It should be appreciated that the particular embodiment of the lateral stiffening means 108 depicted in FIG. 1A is provided merely for purposes of example and does not constitute a limitation of the present invention. Rather, lateral stiffening means 108 may include any structure or structures that limit lateral movement of the panel 102 in response to touch forces.

Since panel 102 is not secured via the force sensor or the preload springs 109 in the embodiment depicted in FIG. 1A, lateral stiffening means 108 is employed both to maintain basic geometry and to define dynamic lateral stiffness. Note, however, that lateral softening means 107 may be used even though panel 102 has the potential to slide by tiny amounts with respect to the sensors beneath. Preload forces, in addition to the touch force itself, may create sufficient friction to prevent any plausible tangential force from causing such sliding during a normal touch. It is, therefore, the ratio of the lateral stiffness of lateral stiffening means 108 to that of the sensor assemblies only in the differential sense for small forces that cause no sliding which determines the path taken by tangential touch forces.

Although lateral stiffening means 108 is depicted in FIGS. 1A–1B as a single piece of material, this is simply an example and does not constitute a limitation of the present invention. For example, lateral stiffening means 108 may be assembled with 4 tape segments, butted or overlapped in any of various ways at the corners. Alternatively, lateral stiffening means 108 may be, for example, a single sheet of transparent film, attached with an optically clear adhesive over the full interior area of touch surface 103a. Lateral softening means 107 may include a thin layer of a tough but soft elastomer, such as natural rubber. However, the simpler choice of soft acrylic adhesive has proven sufficiently tough and compliant, in spite of being somewhat thinned in the bearing area when the foil is only 0.0015 in. thick. Panel 102 may be detailed at its edges, especially if made of plastic. For instance, holes parallel to the surface near the corners of the panel 102 may retain angled preload spring ends, with hooks bent inward from frame 104a to hold the preload springs at their centers.

Figure 2:
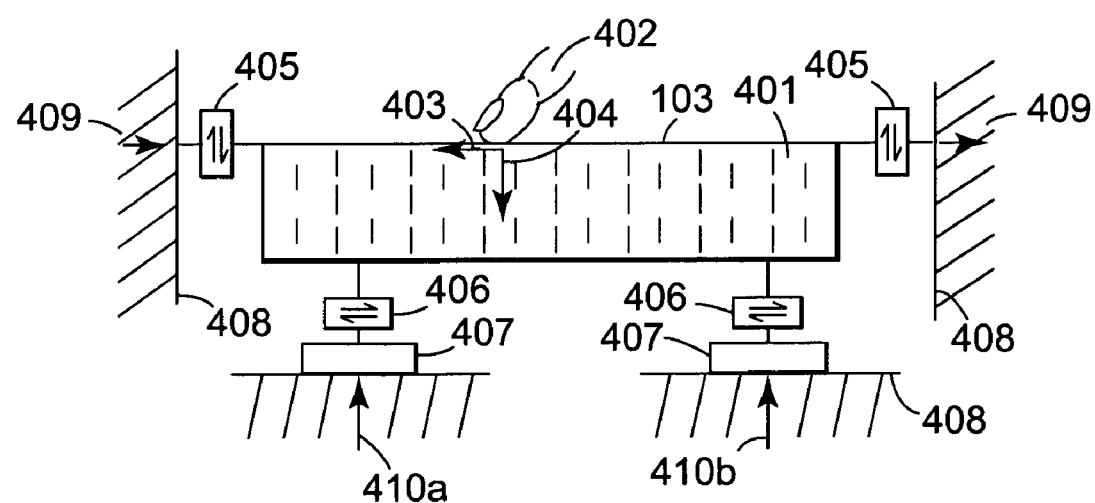
FIG. 2 is a partially schematic cross-sectional view of a general touch-locating system, illustrating reduction of tangential force errors by one embodiment of the present invention.

Features of lateral stiffening means (e.g., lateral stiffening means 108) employed in various embodiments of the present invention are now described in more detail. Referring to FIG. 2, touch surface 103 (which may, for example, be the touch surface 103a shown in FIGS. 1A–1B) resides upon floated structure 401, which may represent, for example an overlay (such as overlay panel 102 shown in FIG. 1A) or a display unit (such as an LCD panel). A finger 402 applies a touch force comprising tangential component 403 and perpendicular component 404. Structure 401 is supported by a lateral stiffening means 405, and by force sensors 407 through lateral softening means 406. Receiving all forces is surrounding structure 408. Tangential component 403 of the touch force applied by the finger 402 generates reactions 409, and perpendicular component 404 of the touch force applied by the finger 402 generates reactions 410a and 410b.

Due to the construction and positioning of lateral stiffening means 405, the combination of component 403 and reactions 409 generate no net moment. In the absence of such extraneous moments, then, the partitioning of the reaction to perpendicular component 404 between 410a and 410b accurately locates the touch position in accordance with force and moment equations that are well-known to those of ordinary skill in the art.

Although lateral stiffening means 405, force sensors 407, lateral softening means 406, and surrounding structure 408 are illustrated in FIG. 2 in generalized form, it should be appreciated that these elements may be implemented, for example, as shown in FIGS. 1A–1B. For example, lateral stiffening means 405 may be lateral stiffening means 108, force sensors 407 may be the force sensors shown in FIGS. 1A–1B, lateral softening means 406 may be lateral softening means 107, and surrounding structure 408 may be enclosure 202 and/or frame 104a.

Lateral stiffening means 405 is in part so named because it rests where a void might well exist in a conventional force-based touch device, while lateral softening means 406 is in part so named because it is inserted where a rigid coupling typically exists in conventional force-based touch devices. Note that in both cases, though, a coupling may be desired which is much stiffer to forces applied in one direction than to another at right angles. Columns, beams, plates, and membranes of high aspect ratio, for example, have this property, as do high aspect layers of elastomer trapped between rigid flat surfaces. Classical bearings do also, of course, but here it is better, as well as simpler, to avoid rubbing surfaces that may exhibit stiction at small force levels.

Some additional aspects should be noted which are not shown directly in FIG. 2. Lateral stiffening means 405 may also be present along the edges above and below the plane of the FIG. 2. In various embodiments of the invention, reaction forces 409 are developed primarily through shear in these other portions of lateral stiffening means 405.

Figure 3A:
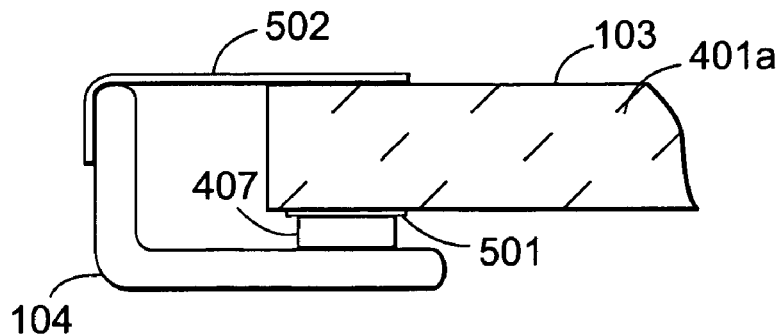
FIGS. 3A–3C provide partial cross sectional views illustrating the use and limitations of a flat suspension film or beam used as a lateral stiffening means.
Figure 3B:
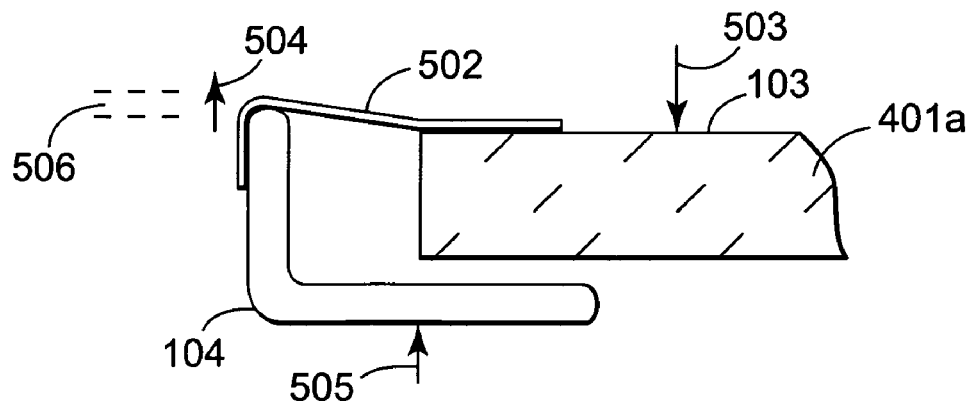
Figure 3C:
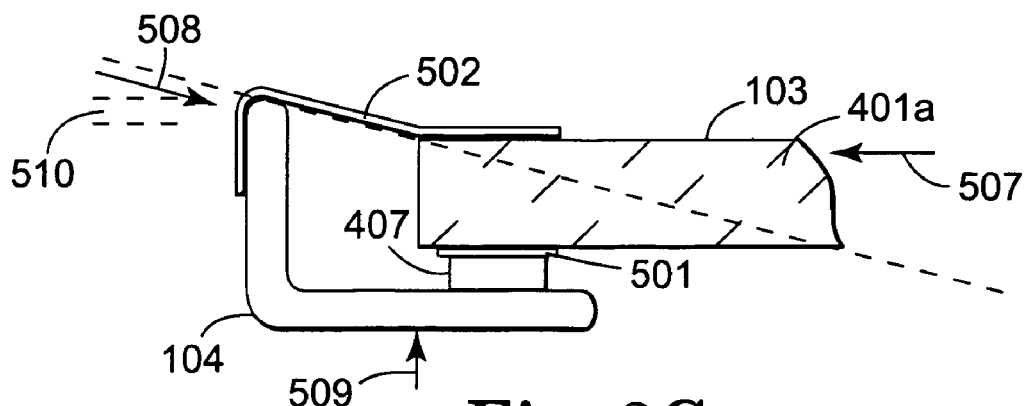

FIGS. 3A, 3B, and 3C illustrate various embodiments of the lateral stiffening means 405. Generalized floating structure 401a, which may represent an overlay (such as overlay panel 102 shown in FIG. 1A) or display unit (such as an LCD panel), receives perpendicular support from generalized force sensor 407 through lateral softening means 501, portrayed in this variation as an elastomeric sheet. Lateral stiffening means 502 is a sheet of material, with its freely flexing region intended to rest as close as possible to the plane of touch. Lateral stiffening means 502 may be carried around the full periphery of 401a, or may be confined to certain regions, such as those near the sensor mountings. There are two independent degrees of tangential force; one directed along the left/right axes of FIGS. 3A–3C, and tending to place the portion of lateral stiffening means 502 visible in these sections into tension or compression, and another perpendicular to the plane of FIGS. 3A–3C, and tending to place the portions of lateral stiffening means 502 visible in these sections into shear. If lateral stiffening means 502 is kept essentially flat, both degrees are effectively resisted by all portions of lateral stiffening means 502. For most of the materials of which lateral stiffening means 502 might be composed, the ratio of Young's modulus to the modulus of rigidity is such that about 3 to 4 times as much stiffening will come from portions of lateral stiffening means 502 in tension or compression as from equal lengths in shear.

Referring to FIG. 3B, perpendicular force 503 may cause a perpendicular deflection of touch surface 103 through distance 506, such that the flexing portion of lateral stiffening means 502 becomes tilted and stretched. This distance 506 may be particularly large at points midway between the support offered by the sensors, as is depicted in this cross-section. Tension in lateral stiffening means 502 rises as the square of distance 506. Due to the tilting of lateral stiffening means 502, this tension has a vertical component 504, which becomes part of the balancing reaction to applied force 503. This diminishes the reaction component 505, passing through the out-of-section sensors, to below the expected value, causing some error.

FIG. 3C depicts a situation in which the flexing portion of lateral stiffening means 502 is tilted in the absence of perpendicular load. Distance 510 may represent, for example, either an intentionally raised lip of frame 104, or the effect of component and assembly tolerances. Tangential force 507 causes compression in lateral stiffening means 502. Since this compression is tilted, it contains a perpendicular component balancing reaction 509, in addition to a tangential component that balances the tangential force 507. A similar situation in tension occurs along the opposing edge. Error force 509 and its equal but opposite counterpart acting upon sensors along the opposing edge, together represent a substantial moment generated in reaction to tangential force 507. This "jamming" effect represents another characteristic of the configurations depicted in FIGS. 3A–3C.

Figure 4:
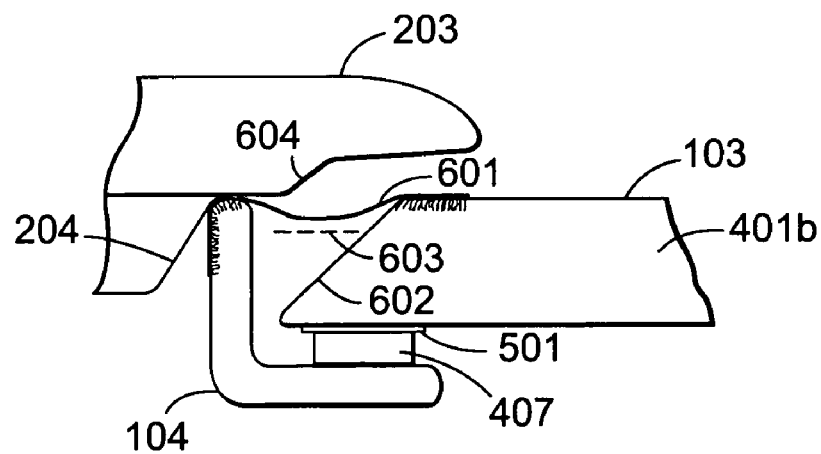
FIG. 4 is a partial cross sectional view of a lateral stiffening means with extended range of vertical motion, and directionally selective lateral stiffening.

FIG. 4 depicts another lateral stiffening means 601, which is provided everywhere with a modest contour. Because lateral stiffening means 601 is compliant vertically (i.e., in a direction substantially normal to the touch surface 103), this contour allows surface 103 to be deflected substantially without placing lateral stiffening means 601 into tension. This improves the range of touch forces which may be located accurately, especially for touches near the edge between sensors. The contour of lateral stiffening means 601 also greatly decreases the lateral stiffening effect in tension and compression. Since the lateral stiffness provided by the sides of lateral stiffening means 601 in shear may still be made sufficient, however, this is advantageous in greatly decreasing error from imperfections which have effect selectively through the tension and/or compression of the lateral stiffening means (referred to herein as the "jamming effect").

Floating structure 401b is depicted with beveled edge 602. This allows the force sensors and the lateral stiffening means 601 to share the same narrow border width, while preserving clearance for the flexing portion of the latter. Application bezel 203 is depicted with additional feature 604 intended to guarantee clearance between the bezel 203 and both lateral stiffening means 601 and surface 103. Bezel 203 is depicted as carrying fully over the border structures, both to conceal them cosmetically, and to protect lateral stiffening means 601 from damage.

An additional point may be noted with regard to the contour of lateral stiffening means 601. The elastic axis of rotation for lateral stiffening means 601 in shear lies at the level of dashed line 603. For roughly circular contour, the offset of dashed line 603 from the plane of touch is approximately twice the maximum offset of lateral stiffening means 601 itself. If the contour of lateral stiffening means 601 were that of a shallow "V," dashed line 603 would lie at the level of its point. Since the plane of accuracy lies at the level of dashed line 603, tangential force rejection is not perfect; it is, however, still substantial.

Figure 5A:
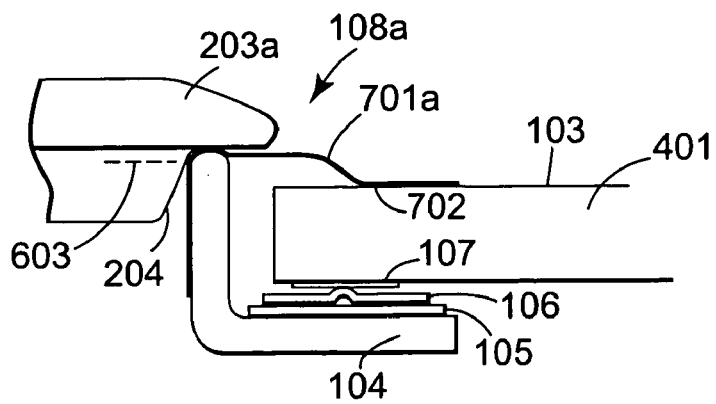
FIGS. 5A–5C are partial cross sectional views of further variations on the lateral stiffening means.
Figure 5B:
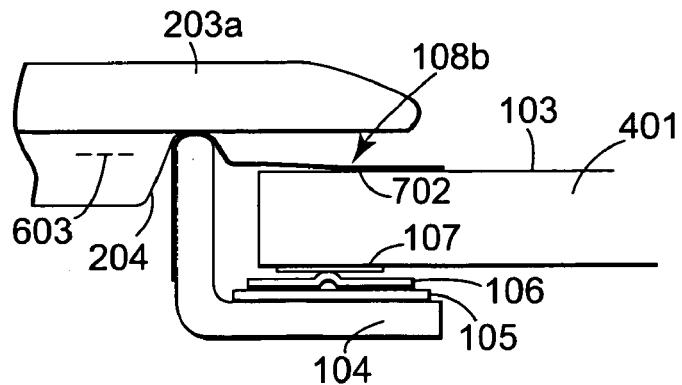
Figure 5C:
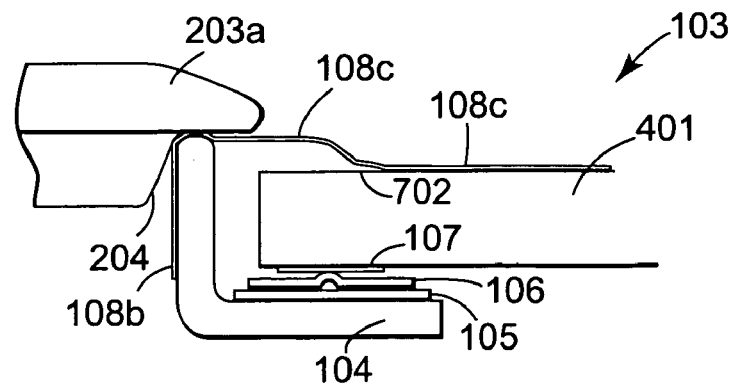

FIGS. 5A–5C depict additional variations 108a–c of the lateral stiffening means 108, as may be applied, for example, to the embodiment depicted in FIGS. 1A–1B. In these variations, frame 104 is depicted with an intentional elevation, or lip, which may rise 0.020 in. above touch surface 103. Lateral stiffening means 108a also acts as a seal and is provided with a fairly abrupt "dog leg" contour 701a. Most of the flexing region of 108a is backed up by overlay 102. This portion achieves the advantage of becoming quite resistant to damage, and need not necessarily be covered by the application bezel 203. It should be appreciated that in other embodiments, lateral stiffening means 108a may not provide a seal between frame 104a and touch surface 103.

In FIG. 5A, contour 701a is placed close to the point 702 at which lateral stiffening means 108a attaches to surface 103. Bezel 203 is of minimal width. Lateral stiffening means 108a may be opaque, and of a color suitable for a visible detail of the border. Note that there is little or no exposed cavity under the bezel 203a where contamination may collect, so that this arrangement may be particularly suitable for dirty environments. In FIG. 5B, contour 701b is placed close to the lip of frame 104. Bezel 203b is depicted concealing the border structures. Lateral stiffening means 108a and 108b in FIGS. 5A and 5B, respectively, may be applied as, for example either four separate tapes, or as a single die cut piece.

For the dog-leg lateral stiffening means 108a–b of FIGS. 5A–5B, the elastic axes 603 for rotation in reaction to shear lie at approximately the average height of the flexing portion of the lateral stiffening means above touch surface 103. The resulting plane of accuracy may be sufficiently close to the touch plane for many purposes. Note, however, that any residual jamming effect tends to put the plane of accuracy below the touch surface 103, whereas the axes 603 here lie above it. Thus by adjusting the position of contour 701 and/or the lip height, the two opposing effects may be adjusted to cancel out. This constitutes one example of a lateral stiffening means that creates tangential reaction forces much more closely confined to the plane of touch than is the lateral stiffening means itself.

In FIG. 5C, lateral stiffening means 108c comprises a transparent film which passes over the entire touch surface 103. The area of lateral stiffening means 108c interior to the point of attachment 702 is fastened with optical adhesive. If bezel 203 is minimal as shown, and if floating structure 401 is otherwise transparent, it may be cosmetically advantageous to coat the upper or lower surface of floating structure 401 along the edges with opaque material (so as to conceal sensors and other edge structures from user view). If floating structure 401 is a glass overlay or fragmentable display, lateral stiffening means 108c provides an advantageous safety effect in case of breakage. Since surface 103 is of uniform optical quality right up to the point of attachment 702, this point may now be placed farther inward without increasing the border width. Since the full border width is now available for the flexing portion of 108c, the advantage is gained that the lateral stiffening means 108c may now be made thicker, and therefore tougher, without giving it excessive perpendicular stiffness.

In one aspect of the present invention, first and second elastic means are respectively provided above and below a touch surface in a touch location device. The first and second elastic means are balanced to yield an elastic center located within the plane of touch, or at least within the tolerable zone of offset of the plane of touch. Elastic means are so provided within sensing connections in the touch location device as to produce a surface of accuracy that is within the tolerable zone of offset of the plane of touch, thereby reducing or eliminating the impact of tangential forces on force sensors in the touch location device.

Figure 7A:
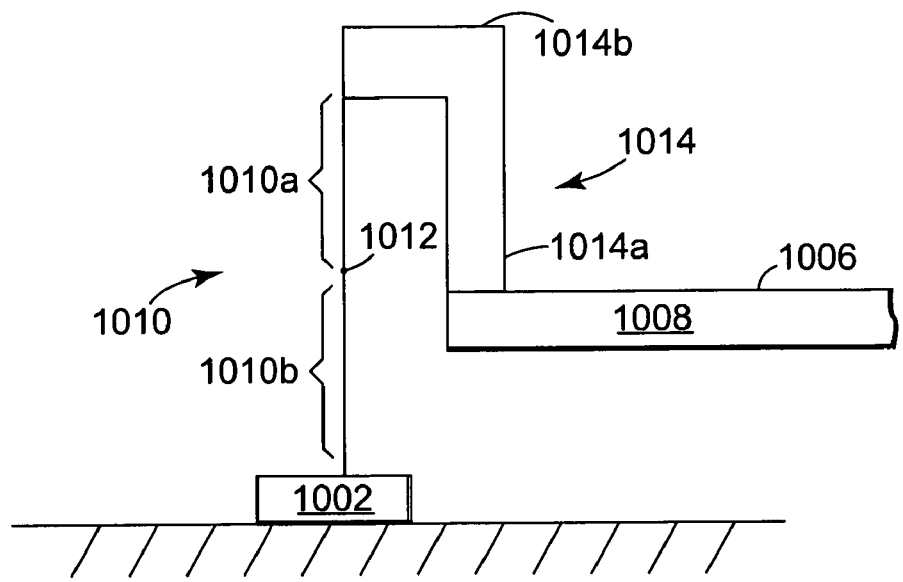
FIGS. 7A–7B are partial schematic cross-sectional views of touch location devices including balanced elastic means according to one embodiment of the present invention.

For example, referring to FIG. 7A, an example of a force sensor assembly including elastic means 1010 for generating a surface of accuracy that is within the tolerable zone of offset of a plane of touch is shown. A force sensor 1002 is mounted on a rigid support surface 1004. Force sensor 1002 (and other force sensors shown and described elsewhere herein) is shown in generalized form for ease of illustration and may, for example, be piezoelectric, resistive, capacitive, or of any type of construction offering sufficient stiffness. While the examples herein are drawn with respect to the assumption that all relevant flexure will occur within the elastic means discussed, this is not a limitation of the present invention. Rather, it should be understood that modest elastic flexure in the "rigid" structures may be accommodated by adjusting the relative stiffnesses of the elastic means 1010 above and below the plane of accuracy. In cases where such flexure in the "rigid" structures would otherwise be too great to allow such adjustment (e.g. by requiring a negative stiffness value), the stiffnesses of elastic means 1010 above and below the plane of accuracy may be jointly lowered, so as to allow their relative adjustment to have the desired effect. Force sensor 1002 senses touch forces applied to touch surface 1006 of touch panel 1008. Rigid support member 1014 includes: (1) a vertical portion 1014a that extends upward from an edge of touch surface 1006, and (2) a horizontal portion 1014b that extends away from the edge of touch panel 1008 to provide clearance for elastic means 1010.

One end of elastic means 1010 is coupled to the underside of the horizontal portion 1014b of rigid support member 1014, while the other end of elastic means 1010 is coupled to an upper surface of force sensor 1002. Elastic means 1010 includes an upper portion 1010a above inflection point 1012 and a lower portion 1010b below inflection point 1012.

In a first embodiment, the elastic means 1010 is a beam of uniform modulus and moment of inertia, with portions 1010a and 1010b being of equal length. By symmetry, it may be seen that in this embodiment elastic means 1010 has an inflection point 1012, about which there is no moment produced in response to tangential forces that are applied to the touch surface 1006.

Figure 7B:
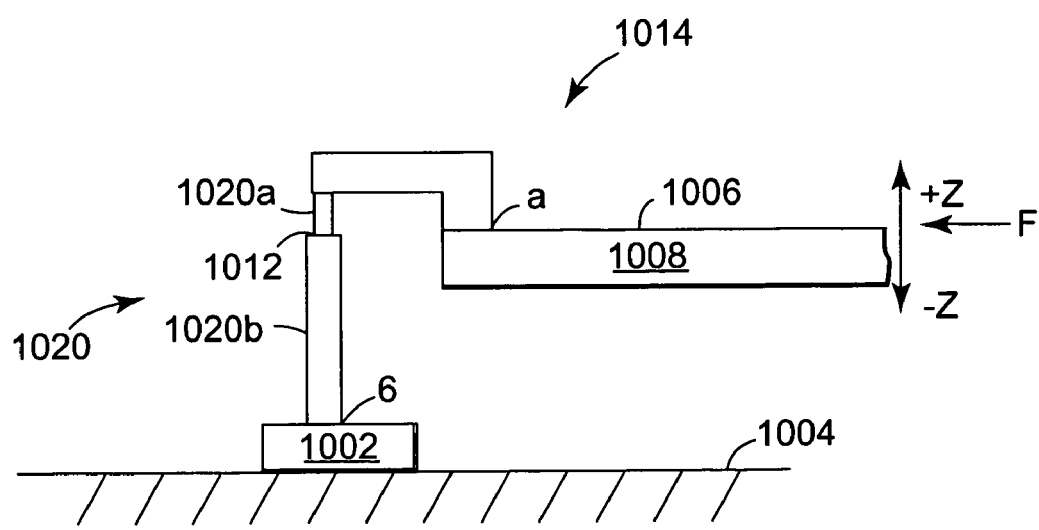

In a second embodiment, turning to FIG. 7B, portions 1020*a* and 1020*b* of elastic member 1014 are each separately beams of uniform modulus and moment of inertia, but with different moments of inertia having a constant ratio, independent of the defining transverse axis. If the ratio of the lengths of the two portions 1020*a–b* is set to the square root of the ratio of their moments of inertia, then there will again be an inflection point at 1012. Thus, for example, elastic member 1014 may have a round section. It may extend with diameter D for 200 mils below plane of touch 1006, and with diameter D/2 for 50 mils above. With an appropriate choice of material and diameter D, elastic member 1014 may be of satisfactory strength, and yet be flexible enough to control the position of inflection point 1012. To accommodate the effect of flexure in surrounding structures however, it may be desirable to make empirical adjustments to the length of portion 1020*a*.

This method for achieving a rearward placement of sensors may be advantageous over that provided by DeCosta, U.S. Pat. No. 4,355,202, in that the quantity of material to transmit force in the vicinity of 1012 may be larger, affording greater strength, and allowing member 1010 to fully interconnect, restrain, and assemble touch panel 1008 to support surface 1004.

Referring again to FIG. 7B, assume also that a horizontal force F is applied to the touch surface 1006. Let z represent distance from the touch surface 1006, and thus the length of the moment arm whereby tangential force induces a moment in 1020. Let M be the moment generated in response to force F at point a, where support member 1020 is coupled to touch surface 1006.

M is ideally zero both at point a, and at the symmetrical point on the other side of the device (not shown). If this is achieved, then the touch surface 1006 does not require spurious vertical sensor forces in either force sensor 1002 or its symmetrical counterpart to maintain equilibrium. Since touch surface 1006 remains essentially horizontal, the integrated turning over the length of 1020 must remain zero. If moment is to be zero when z=0, (i.e. M=0) then:

$$\int_a^b \frac{z}{EI} ds = 0 \qquad \text{Equation 1}$$

where E is Young's modulus and I is the moment of inertia of the section.

If Equation 1 is satisfied, the effects of flexure of the support member 1020 above and below the touch surface 1006 will cancel each other out. Only a pure moment couple and a pure shear force will be felt by the force sensor 1002 at the point of contact b, and the sensor 1002 does not react to pure moment couples or to pure shear forces. Using Equation 1 an appropriate design may be developed for elastic means 1020. Alternatively, either empirical means, or means of analysis well known in the art, may be applied to develop any of the many variations that will be apparent to those of ordinary skill in the art. For instance, in a variation of the embodiment of FIG. 7B, member 1014 may be taken as an elastic extension of elastic means 1020, rather as a separate rigid member. Analysis of the response of this variation to the tangential force F may then be substantially in accord with equation 1. For a tangential force through the plane of the figure (not shown), however, additional torsional flexures must be considered. Since the relative thickness of different portions of the elastic means in both x and y directions parallel to the touch plane may be varied independently, however, the reaction moment at point a may be made zero for both components of tangential force. Also, it will be seen that if sensing connections of differing design or differing orientation of installation are employed within one touch-location device, non-zero moments at point a may be designed to collectively cancel, so that again no spurious perpendicular forces must pass through the sensors to maintain moment equilibrium.

We now consider two further aspects of the invention that are related to other aspects described herein, but benefiting from a somewhat different analysis. In both aspects, a rigid touch surface structure is supported through elastic connections below the touch plane. Sensing is performed by displacement sensors, which may respond, directly or indirectly, to movements of various regions of the touch surface structure with respect to the supporting structure.

These aspects provide elastic support below the plane of touch while maintaining a surface of accuracy in the plane of touch. The first variation accomplishes this with angled axes of stiffness, while the second variation is further novel in accomplishing this with angled axes of sensitivity.

Viewed as force sensors in combination with the elastic connections, the displacement sensors of these aspects are each dependent on all elastic connections collectively. The entire multi-sensor touch-locating device may thus be viewed as a single multi-channel force sensing connection. In various embodiments of these aspects of the invention, greater accuracy is achieved if flexures in the touch panel and support, resulting from touch force, are small compared to the displacements across the elastic connections, as the displacement sensors "see" the effects of both. To the extent that sensors and elastic connections can be closely paired, this sensitivity to error and the corresponding stiffness requirement may be relaxed. In the limit wherein the axes of sensitivity of the displacement sensors each pass through the elastic center of an associated elastic connection, such pairings may again be informative to analyze as a cooperating set of individual, single-channel force sensors. As the displacement point of view is more general, however, it is taken in analyzing these embodiments.

Figure 11:
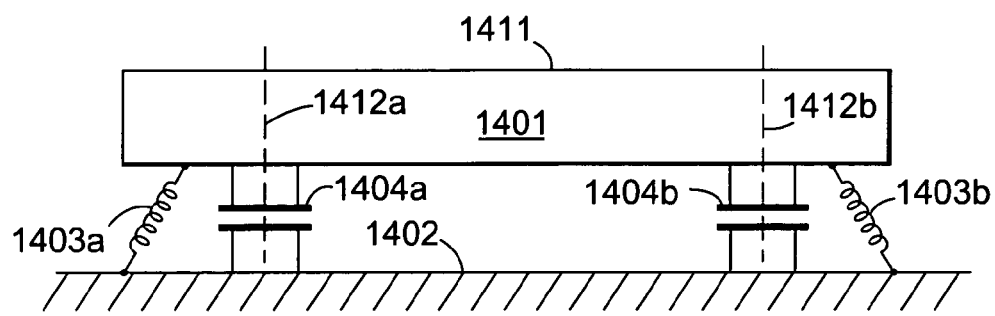
FIG. 11 is a schematic cross-sectional view of a touch location device including displacement sensors and angled elastic means according to one embodiment of the present invention.

Turning to FIG. 11, one embodiment of the invention using elastic correction is depicted. Rigid touch surface structure 1401 is supported on rigid support 1402 by elastic connections 1403*a–b*. Local perpendicular motions of touch surface structure 1401 are monitored by displacement sensors 1404*a–b*, which have perpendicular axes of sensitivity 1412*a–b*. Displacement sensors 1404*a–b* may be capacitive, as suggested by the generalized depictions here, or optical, inductive, etc., or of any type passing insignificant force.

Elastic connections 1403*a–b*, touch surface structure 1401, and support 1402 constitute a system directly equivalent to angled stiffness structure 1300. Thus it is seen how elastic connections 1403*a–b* may be provided so that a tangential force in touch surface 1411 produces a pure lateral displacement in touch surface structure 1401, yielding no output from sensors 1404*a–b*. Thus, the system of FIG. 11 may have no errors in response to tangential components of touch force.

Figure 12:
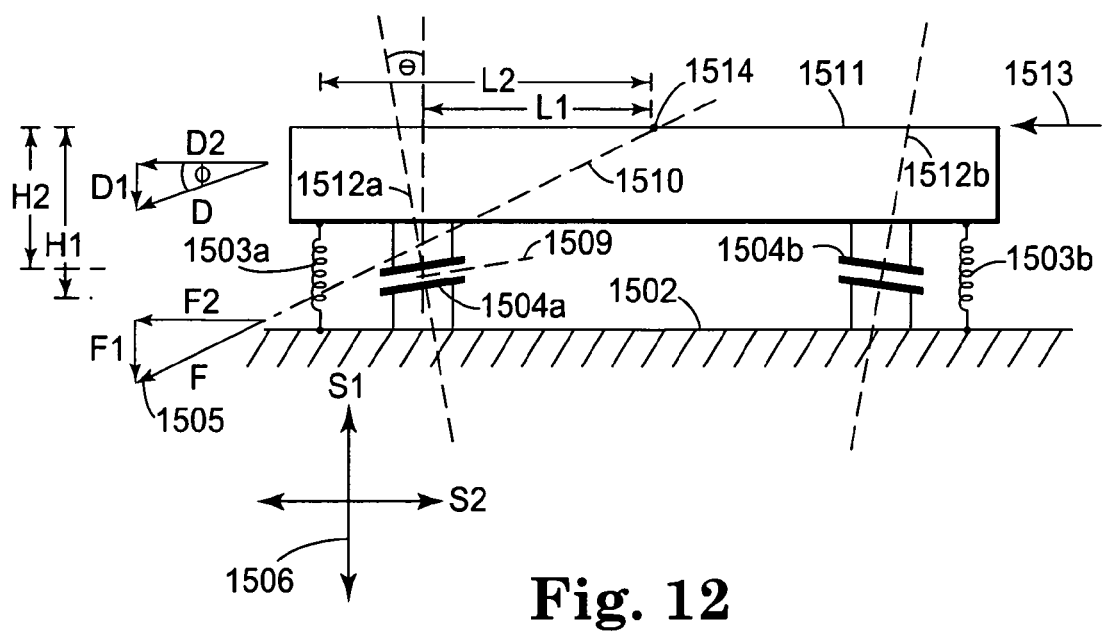
FIG. 12 is a schematic cross-sectional view of a touch location device including angled displacement sensors and non-angled elastic means according to one embodiment of the present invention.

Turning to FIG. 12, one embodiment of the invention using angled axes of sensitivity is depicted. Rigid touch surface structure 1501 is supported on rigid support 1502 by elastic connections 1503*a–b*. Local motions of touch surface structure 1501 are monitored by displacement sensors 1504*a–b* along axes of sensitivity 1512*a–b* that are inclined with respect to touch plane and desired plane of accuracy 1511. Displacement sensors 1504*a–b* may again be of virtually any type, the choice being open to whatever is deemed most suitable to the particular application in terms of size, accuracy, cost, etc.

When a tangential force 1513 is applied to touch surface 1511, touch surface structure 1501 rotates somewhat about a point below FIG. 12. This motion is locally along line 1509 at displacement sensor 1504a. There is another line of displacement (not shown) that is analogous to line 1509, that may be imagined passing out of the figure in response to a tangential force (not shown) passing up through touch surface center 1514. The axis of sensitivity 1512a may clearly be set perpendicular both to this line and simultaneously to line 1509. Similar arguments apply to sensor 1504b, and all other displacement sensors used, even if irregularly placed. Thus, sensor orientations are available that provide general rejection of touch location errors due to tangential force components of the touch.

Such orientations can clearly be found empirically. However, insight may be gained from further analysis.

Continuing with FIG. 12, tangential force 1513 engenders a force of magnitude F in connection 1503a, this force having a perpendicular component with magnitude F1, and a tangential component with magnitude F2, as shown at forces 1505. Force F has line of action 1510, passing through the touch surface center 1514, and passing very close to the elastic center of connection 1503a. (The alignment is not theoretically perfect, as connection 1503a has a small moment reaction to the slight rotation of touch surface structure 1501.) The elastic center of connection 1503a lies distance H2 below the touch plane; the center of sensor 1504a lies distance H1 below the touch plane. The elastic center of connection 1503a also lies distance L2 to the left of center point 1514, while the corresponding distance for the center of sensor 1504a is L1. The ratio F1/F2 can be seen, therefore, to be closely approximated by the ratio H2/L2.

Principal axes and stiffnesses of elastic connection 1503a are illustrated at 1506. The displacement of touch surface structure 1501, as seen by rigid extension at the elastic center of connection 1503, is illustrated at 1507. Perpendicular principal stiffness S1 may exceed tangential principal stiffness S2 as shown (S1/S2>1), and as suggested by the symbol employed to represent elastic connections 1503a–b. In practice, a very wide range of stiffness ratios is possible, and many elastic connection choices may provide a ratio S1/S2 that is less than 1. Since force components F1 and F2 as expressed are already aligned to the principal axes of connection 1503a, the tangent of the angle φ that displacement D makes with the touch plane is D1/D2=(F1/F2)*(S2/S1)=(H2/L2)*S2/S1.

The angle which line of displacement 1509 makes with the touch plane is also the angle θ by which sensor 1504a is optimally inclined. These angles are closely tied to φ, the condition θ=φ holding when the elastic center of 1503a and the sensor center of 1504a superimpose, or lie along a common radius from the center about which touch surface structure 1501 rotates in response to tangential force 1513. This center of rotation lies at the intersection of axes of sensitivity 1512a–b. It also lies along radii passing through the elastic centers of connections 1503a–b, which incline by angle φ from the touch plane normal. Examination of this geometry yields the relation shown in Equation 2:

$$\theta = \tan^{-1}\left(\frac{L1}{\frac{L2^2 \cdot S1}{H2 \cdot S2} + H2 - H1}\right)$$ Equation 2

In establishing design in three dimensions, angle θ is to be taken as the angle made to the touch plane normal by the projection of the axis of sensitivity of the sensor in question into a perpendicular plane containing the x or y axis, and may be determined for each sensor with respect to each axis.

In regard to the stiffness S2, greater values lead to larger θ combined with less lateral movement, which may require less precision maintaining the value of θ in production.

In regard to the embodiments of either FIG. 11 or FIG. 12, the positions of displacement sensors may be chosen with great freedom, so long as they do not all fall close to one straight line. In particular, the sensors may be paired in close proximity to discrete elastic connections to reduce rigidity requirements; or may be inside, outside, alternating with, or different in number from the elastic connections. The perpendicular stiffness of the elastic connections may be made less to require less sensor sensitivity and less structural stiffness, or it may be made more to reduce sensitivity to vibration.

Combinations of angled displacement sensors with angled stiffness elastic connections will also be evident, and are within the scope of the invention.

Various embodiments of the invention employ angled stiffnesses; that is, one or more elastic bodies having a principal axis of stiffness that is oblique with respect to the touch plane normal.

Figure 10A:
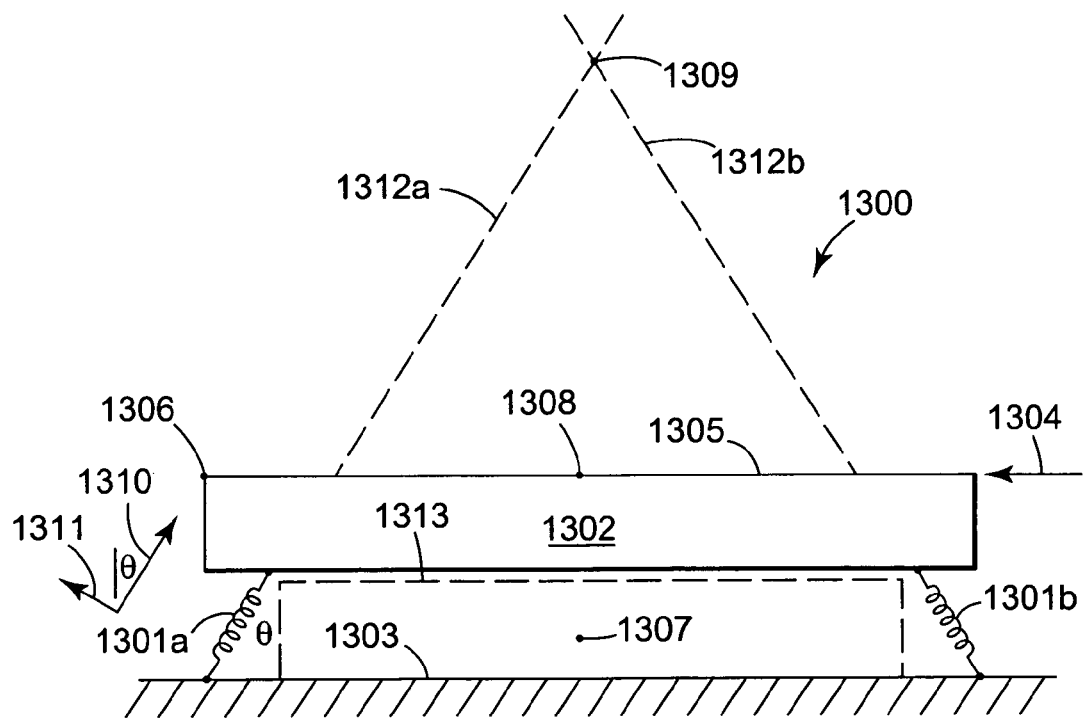
FIG. 10A is a schematic cross-sectional view of an angled stiffness structure including an elastic connection having an oblique greatest principal axis of stiffness, illustrative of like structures employed within several embodiments of the present invention.

Referring to FIG. 10A, angled stiffness structure 1300 comprises rigid body 1302 supported on rigid support 1303 by elastic connections 1301a–b, having corresponding greatest principal axes of stiffness 1312a–b. Elastic connection 1301b is constructed and applied as the mirror image of connection 1301a, as taken across the central plane of FIG. 10A. Normally, elastic connections 1301a–b may be considered to be firmly attached at their ends, and therefore capable to some degree of resisting force in any direction. For elastic connection 1301a, this resistance may have a greatest value lying in a particular direction, represented by the length and direction of greatest principal stiffness 1310. A lesser principal stiffness 1311 of elastic connection 1301a must then lie at right angles to greatest principal stiffness 1310. For purposes of exposition, these two directions may be taken to lie in the plane of FIG. 10A. In three dimensions, a third principal stiffness will then extend at right angles to the plane of FIG. 10A. For concreteness, this last principal stiffness may be taken to have a value equal to that of stiffness 1311, such that the lesser two principal stiffnesses are degenerate.

Tangential force 1304 is applied to body 1302 at the level of surface 1305, which may represent a touch surface. In response, body 1302 will shift leftward, with point 1306 perhaps moving upward as well as left, perhaps downward, or perhaps staying level. Point 1308 in the center of surface 1305 must begin moving purely horizontally, however, as may be seen from symmetry.

The directions of greatest principal stiffness of connections 1301a–b are inclined inward from the normal to surface 1305 by an angle θ. If the stiffnesses are aligned, with θ=0, then the elastic center of structure 1300 lies at point 1307, midway between the separate elastic centers of connections 1301*a–b*. Thus in this case, point 1306 will dip downward as well as to the left in response to force 1304. With θ greater than zero, however, the system's elastic center will rest above point 1307. To see this, imagine that the lesser principal stiffness 1311 is reduced to zero. This may be approached with appropriate construction of elastic connections 1301*a–b*, but may be fully imagined by picturing them mounted with pivots at each end, such pivots lying along the axes of greatest principal stiffness 1312*a–b*. The slightest force 1304 now displaces body 1302, rotating it about a center at point 1309, where these axes intersect. Thus point 1306 now rises as it passes to the left.

Although the elastic center of the system may be the center of rotation when a pure moment couple is applied across it, it is not generally the center of rotation when a translational force is involved. In this special case, however, the two centers may be seen to coincide, as the system will clearly rotate about point 1309 in response to a moment couple.

As the lesser principal stiffness of elastic connections 1301*a–b* is increased, then, the system elastic center must drop smoothly along the plane of symmetry from point 1309 towards point 1307, reaching the latter when the "lesser" and "greatest" principal stiffnesses have equal magnitude.

Thus for any choice of angle θ that causes axes of greatest principal stiffness 1312*a–b* to pass above central surface point 1308, there is a value of lesser principal stiffness 1311 that will locate the system elastic center at point 1308. With such a choice, point 1306 begins moving purely horizontally in response to force 1304. Since force 1304 meets resistance, the final result may be a small horizontal displacement of body 1302, accompanied by insignificant rotation or vertical displacement.

Thus, in one aspect of the invention, an angled stiffness structure may be used to systematically control the position of an elastic center, placing it at locations that may be awkward to achieve without the use of angled stiffnesses. In particular, the invention teaches how an angled stiffness structure 1300 may project an elastic center to a point, such as point 1308, lying beyond a plane, such as plane 1313, that separates it from the associated elastic energy storage.

Interpreted as a lateral stiffening means, it is seen that angled stiffness structure 1300 has a plane of effect containing and located by the elastic center of angled stiffness structure 1300.

Elastic connections 1301*a–b* have been depicted with both a physical structure and end attachments that align with the axes of greatest principal stiffness. This is for explanatory clarity only. Although the semi-schematic symbols chosen to represent connections 1301*a–b* suggest coil springs, which could indeed be used, connections 1301*a–b* may be implemented using other structures, such as elastomeric blocks or moldings, or thin tabs bent and arched from the body of a larger spring metal stamping. Many other variations of material, shape, and construction will occur to one of ordinary skill in the art. Angled stiffness may be achieved as an appropriately formed portion of a larger body, or by combining smaller bodies. The points of attachment of an angled stiffness are also not necessarily related to its principal axes of stiffness.

Figure 10B:
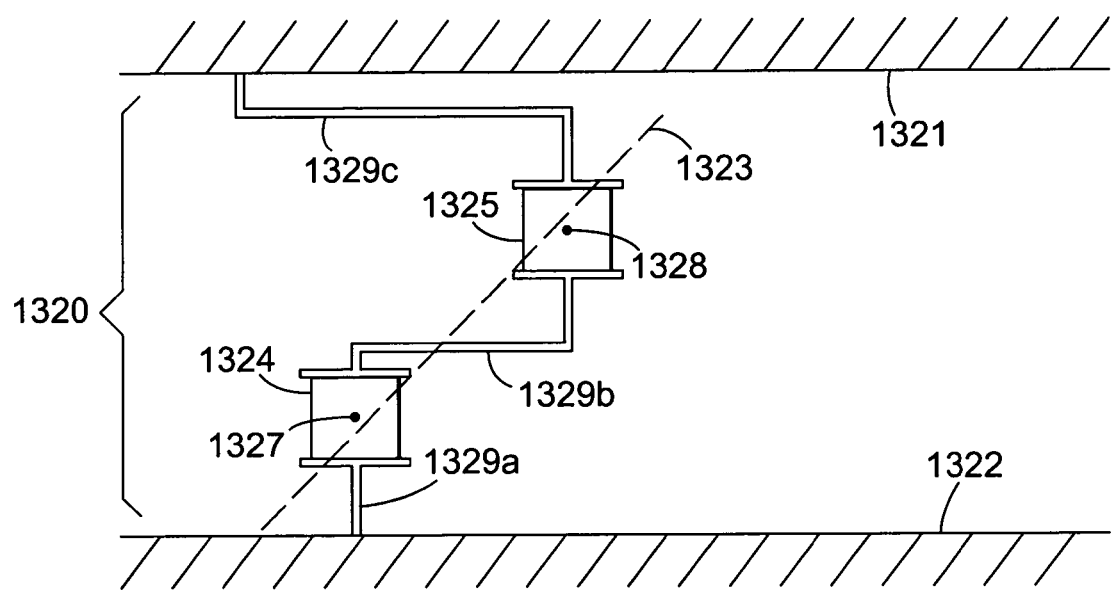
FIG. 10B is a schematic cross-sectional view of a touch location device including angled elastic means according to one embodiment of the present invention.

In FIG. 10B, for instance, illustrative elastic connection 1320 runs between rigid body 1321 and rigid support 1322, providing oblique greatest principal axis of stiffness 1323. Elastic bodies 1324 and 1325, having elastic centers 1327 and 1328, are coupled in series with rigid links 1329*a–c*. Since links 1329*a* and 1329*c* are rigid, affixing rigidly to the bodies below and above, their paths and points of attachment may be chosen for convenience, having no effect on overall elastic behavior, or on axis 1323. Note that elastic bodies 1324 and 1325 may individually have principal axes of stiffness that are not oblique. When in series connection, however, link 1329*b* may rotate in response to overall displacement in a direction perpendicular to the line between the elastic centers 1327 and 1328. This greatly reduces resistance to displacement in this direction, leaving the greatest principal axis of stiffness 1323 passing close to centers 1327 and 1328. The obliquity of axis 1323 thus results from the oblique positioning of series-connected elastic centers 1327 and 1328. Thus also it is seen that an elastic center may be controlled or projected, using angled stiffnesses resulting from oblique aspects of structure, even when no individual sub-element is oblique.

Returning again to FIG. 10A, we may consider angled stiffness structure 1300 in three dimensions. It may be desired that the overall elastic center of structure 1300 remain at the same height for forces passing into and out of the plane of FIG. 10A, as for those directed to the left or right. To accomplish this, discrete elastic connections similar to elastic connections 1301*a–b* may be spaced at intervals around the periphery of some closed curve underlying rigid body 1302, with each inclined inward toward a common central axis. Elastic connections may also be inclined to the side of such an axis, as long as the net inclination is inward, and combinations of connections jointly restore the adequate balance.

Alternatively, a continuous elastic member with an inclined axis may wrap around such a curve, elastic connections 1301*a–b* then representing the effect of sections near the plane of FIG. 1A. In either case, elastic connections above or below the plane of the figure, and falling closer to the center with respect to the left-right axis, will reduce some of the projective effect of elastic connections 1301*a–b*. This may be taken into account when selecting an appropriate angle θ, and an appropriate ratio of stiffness 1310 to stiffness 1311.

For a given height of the overall elastic center, there is a minimum value of this ratio sufficient to produce such height, and a single value of θ to which it corresponds. For larger ratios, however, there are two different values of θ providing the same desired height of the overall elastic center. The solution with the smaller, less oblique value of θ corresponds to a structure 1300 with a relatively greater perpendicular stiffness, and a relatively lesser tangential stiffness, while the solution with the greater, more oblique value of θ provides less perpendicular stiffness, and more tangential stiffness. Different applications described elsewhere herein may operate better with one solution or the other. The calculation of appropriate solutions flows from principles of mechanics that are well-known to those of ordinary skill in the art.

Figure 8A:
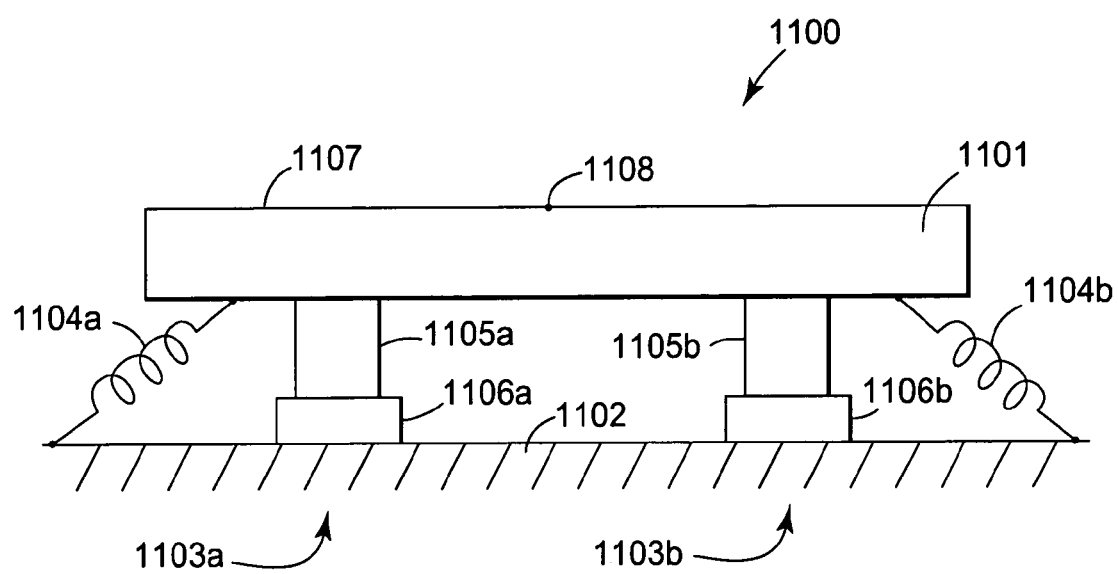
FIG. 8A is a schematic cross-sectional view of a touch location device including angled elastic means according to one embodiment of the present invention.

In one aspect of the present invention, divided force paths are provided in a touch location device using lateral stiffening means removed from the plane of touch. For example, turning to FIG. 8A, force sensing touch location device 1100 comprises a touch panel 1101 with touch surface 1107. Panel 1101 is carried on support surface 1102 through sensing connections 1103*a–b* and oblique-stiffness elastic connections 1104*a–b*. Sensing connections 1103*a–b* comprise sensor assemblies with force sensors 1105*a–b* and lateral softening means 1106*a–b*. The combination of panel 1101, support 1102, and elastic connections 1104*a–b* constitute a structure analogous to angled stiffness structure 1300 (FIG. 10A).

In a first embodiment, lateral softening means 1106a–b offer a lateral stiffness which is insignificant compared to that offered by the elastic connections 1104a–b. The inclination and stiffness ratios of connections 1104a–b may further be chosen to provide, in the absence of sensing connections 1103a–b, an elastic center 1108 in touch plane 1107. A tangential force applied to touch plane 1107 then yields pure lateral motion, without vertical deflection over the area of either sensor connection. Thus it may be seen that with the sensing connections 1103a–b reinstalled, the same tangential force continues to produce pure lateral motion, carrying sensors 1105a–b along, but passing no significant force through them. Thus touch location device 1100 may be made to have a plane of accuracy substantially coincident with its touch plane.

In a second embodiment, lateral softening means 1106a–b may offer nontrivial lateral stiffness. The inclination and stiffness ratios of connections 1104a–b, however, may be chosen to provide, in the absence of sensing connections 1103a–b, an elastic center somewhat higher than point 1108. It may be seen that if the lateral stiffness of the sensor assemblies is not excessive, choices will exist for connections 1104a–b that cancel out the effect of this stiffness, so as to again place the plane of accuracy within the tolerable zone of offset of the plane of touch. In yet another case, it may be seen that if sensor connections 1103a–b provide not only nontrivial lateral stiffness, but also a somewhat oblique stiffness, appropriate adjustments to elastic connections 1104a–b may still achieve coincidence between the plane of accuracy and the plane of touch.

Force sensors 1105a–b may be of any design, and may be vertically stiff. Lateral softeners 1106a–b may be either above or below the sensors, and may be omitted if the sensors have sufficient lateral compliance. Either sensors 1105a–b or lateral softeners 1106a–b may also comprise a rotational softener, to reduce detrimental effects of flexure in either panel 1101 or support 1102. A choice of the greatest practical inclination of elastic connections 1104a–b may be made, to offer the greatest lateral stiffening combined with the least perpendicular stiffness. Low perpendicular stiffness in elastic connections 1104a–b allows most perpendicular touch force to flow through sensors 1105a–b, and also reduces touch location error due to flexure in panel 1101 or support 1102. Elastic connections 1104a–b thus comprise a lateral stiffening means with elastic connections behind the plane of touch.

Figure 8B:
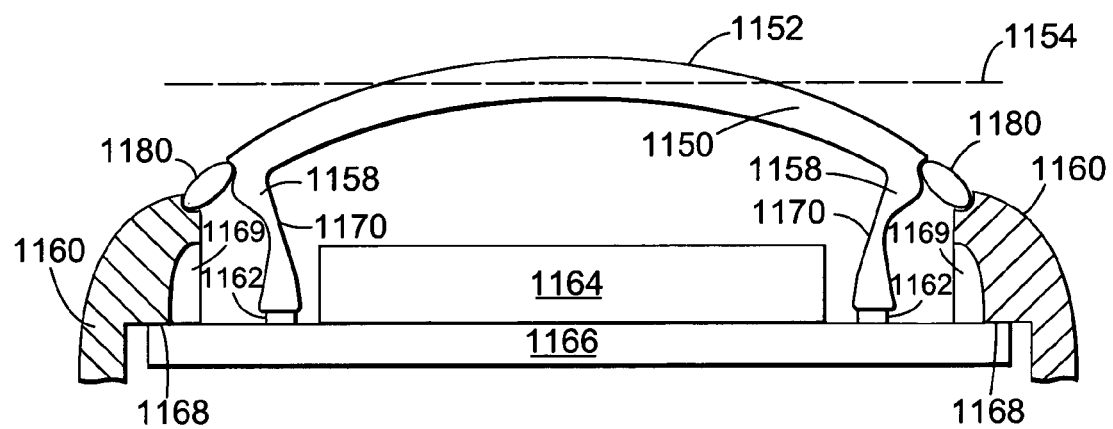
FIGS. 8B–8D are cross-sectional views of touch location devices including non-planar touch surfaces according to one embodiment of the present invention.

FIG. 8B depicts a touch-enabled cell phone application with a domed touch lens 1150 according to one embodiment of the present invention. The shape of domed lens 1150 may be desired, for example, for aesthetic reasons, or for functional reasons of strength or rigidity. Since touch surface 1152 of lens 1150 is not a plane, perfect rejection of tangential forces is no longer possible with three-degree force sensing. A good compromise plane of accuracy 1154 is still possible, but, as shown, it falls significantly above any region practically available for a lateral stiffener.

Shell 1160 seats firmly against circuit board 1166, which together with other structures below form and effectively rigid support. Circuit board 1166 rests against shelf 1168 and/or ribs 1169 of shell 1160. The desired plane of accuracy 1154 may be obtained with the help of a suspension member 1180 operating below the touch surface 1152. This member 1180 may also function as a seal, and as a lateral stiffening means using elastic correction from below.

The suspension member 1180 is angled to produce a "jamming" effect. In one embodiment of the present invention, suspension member 1180 is disposed between vertical force transmission element 1158 and shell 1160 at an angle to the desired plane of accuracy 1154 that results in plane of accuracy 1154 being placed at the desired height. Element 1158 is vertically stiff, but quite soft laterally, due to its length, working in combination with necking feature 1170.

Figure 8C:
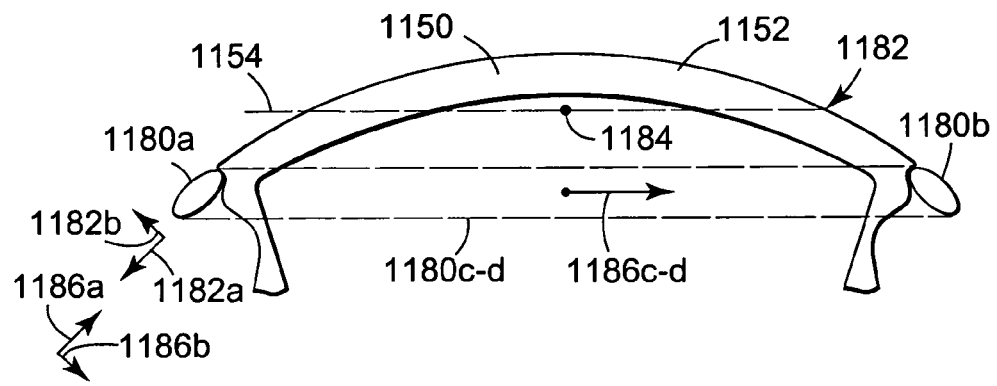

More specifically, the angle at which suspension member 1180 should be placed is chosen as follows in one embodiment of the present invention. Referring to FIG. 8C, a partial cross section of a cell phone application incorporating the suspension member 1180 of FIG. 8B is shown. Lens 1150 may have an essentially square plan. Member 1180 may then have segments 1180a–b cut perpendicularly by the plane of the figure, and segments 1180c–d running lengthwise above and below the plane of figure. A tangential test displacement 1182 may be applied to the touch surface 1152. The design of suspension member 1180 is then chosen so that the reaction in member 1180 to test displacement 1182 generates no moment about center point 1184 in the desired plane of accuracy 1154. If there is no such reaction moment, then when the test displacement is produced by a tangential test force in plane 1154, the force sensors 1162 (FIG. 8B) will not experience any perpendicular forces to balance this moment. Thus force sensors 1162 will not respond to any tangential force component of a force applied in the plane of accuracy 1154, nor excessively to tangential components applied to the touch surface 1152.

It is to be appreciated that the design of member 1180 to minimize tangential force error may be achieved empirically, as well as by a variety of calculation techniques, including, but not limited to, full finite element analysis. The embodiment of FIGS. 8A–8D, however, lends itself to analysis in terms of simple compression, shear, and beam flexure of elementary shapes. Such an analysis may provide more insight into the method of the invention that other, potentially more precise approaches, and now will be explained further.

Test displacement 1182 may be represented as a sum of components 1182a and 1182b. Suspension member segment 1180a is compressed along its breadth by component 1182a, and displaced transversely by component 1182b. The reactions to these components in segment 1180a may be represented as a sum of orthogonal force components 1186a and 1186b. Force component 1186a is parallel to the breadth of elastic correction and seal member segment 1180a, while force component 1186b is perpendicular to the breadth of segment 1180a.

Segments 1180c–d, running parallel to the test displacement 1182 above and below the plane of the figure, also generate shear reactions 1186c–d. These are parallel to the test displacement 1182, as segments 1180c–d do not have inclined stiffness in this direction.

Figure 8D:
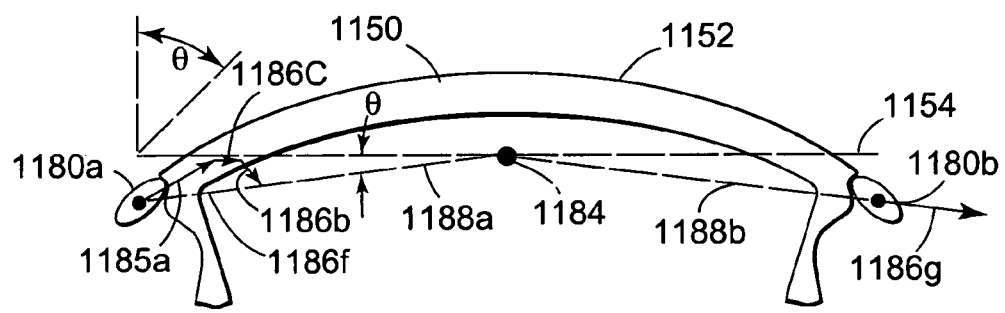

Turning to FIG. 8D, the effect of all reaction forces in member 1180 around the left half of lens 1150 is summarized by a single force 1186f with line of action 1188a. An analogous force 1186g with line of action 1188b summarizes the effect of all reaction forces from member 1180 on the right have of lens 1150. Force 1186f may be derived from a force composition diagram as shown. Due to the symmetry of the loading, forces at 1186a and 1186b may be treated as arising near the centroid 1189 of member segment 1180a. Similarly, shear forces 1186c–d arise symmetrically above and below the plane of the figure near the centroids of member segments 1180c–d. Consider, however, that since pure test displacement 1182 is to be enforced without rotation, forces at 1186c–d may each be thought of as the sum of two forces of equal magnitude and direction, one arising in the left half of the segment, and the other arising in the right half of the segment. The two "left halves" of forces 1186*c–d* summed together then constitute the remainder of all the force applied to the left half of lens 1150, and are shown as force 1186*e*. Force 1186*e* has the same magnitude and direction as forces 1186*c–d*. It also has a line of action that passes close to centroid 1189 of segment 1180*a*, and so may be depicted as transported there without change of effect.

Displacements 1182*a* and 1182*b* have magnitudes equal to that of test displacement 1182 multiplied by the sine and cosine, respectively, of the angle θ. Dominant reaction force 1186*a* may be computed from the direct compression of suspension member segment 1180*a* by displacement 1182*a*. Minor reaction force 1186*b* may be computed from the transverse deflection 1182*b* of member segment 1180*a*, treating it as a broad, guided-end beam. As this beam may be of rather "stubby" aspect, reaction force 1186*b* may be somewhat reduced by the effects of direct shear, but is dominated by the beam stiffness of member 1180. The relative importance of reaction force 1186*b* is therefore controlled by the ratio of the thickness of member 1180 to the length of the gap bridged by member 1180.

Force 1186*e* may be computed from the response of either of similar member segments 1186*c–d* to the direct lateral shear of test displacement 1182. Note that if member 1180 is elastomeric, and angle θ is not too large, the magnitude of force 1186*b* will be close to four times that of force 1186*e*. This is a reflection of the fact that elastomers have a Poisson's ratio very close to ½, and of the fact that as a beam, segment 1180*a* is quite "broad" compared to its "length".

Forces 1186*f* and 1186*g* sum to the full reaction force to test displacement 1182 arising in the elastic shunt connections. By symmetry, it is seen that the lines of action 1188*a* and 1188*b* of these component reaction forces intersect at a point 1184, through which the line of action of their resultant, the full elastic shunt reaction, then passes. Also by symmetry, this line of action of the full shunt reaction is horizontal, falling in plane 1154 and in the plane of the figure. Consider that test displacement 1182 may be produced by a pure tangential test force, equal and opposite to the reactions in the shunt connections, and applied at the level of point 1184 and plane 1154. In this case, and only at this level of application, is equilibrium maintained without additional reaction forces being required in the sensing connections. Thus a centered and aligned tangential force applied in plane 1154 produces a pure tangential displacement, with no forces passing through the laterally soft sensing connections. By arguments developed elsewhere herein, however, it follows that no tangential force applied in any direction anywhere within plane 1154 will register significantly on the sensors. Thus desired plane of accuracy 1154 is seen to be, in fact, that actual plane of accuracy, and the shunt elastic connection provided by member 1180 is seen to comprise an effective lateral stiffening means.

Control of the height of plane of accuracy 1154 may be achieved in any of a variety of ways. For example, member 1180 may be provided with a bulge or contour to its cross section. This controls the net reaction angle φ (the angle between test displacement 1182 and the lines of action 1188*a–b*) by decreasing the magnitude of force 1186*a* while forces 1186*b* and 1186*c* remain largely unchanged.

Alternatively, the desired surface of accuracy 1154 may be obtained by changing the mounting angle θ between the breadth of member 1180 (the direction of greatest principal stiffness) and the normal to mounting plane (which plane is parallel with the desired plane of accuracy 1154). This controls the net reaction angle φ by changing the angle of reaction force 1186*a*, and both the angle and magnitude of reaction force 1186*b*. As angle θ is initially decreased from a flat mounting, angle φ first increases, due to reaction 1186*a* turning vertical. As member 1180 is tilted further upward, the magnitude of reaction 1186*b* begins to rise, tending to counteract this increase in angle φ. With further decrease in angle θ, the falling magnitude of reaction 1186*a* and rising magnitude of reaction 1186*b* reverse the trend of angle φ, causing it to decrease. Throughout this, reaction 1186*e* remains unchanged.

Yet another way of obtaining the desired plane of accuracy 1154 is to change the relative thickness of member 1180. This controls the net reaction angle φ by changing the relative magnitude of reaction force 1186*b*.

In situations where it is desired to keep vertical stiffness to a minimum, the mounting angle θ of member 1180 should be maximized, to minimize reaction forces 1186*b*. This generally comprises taking the "flatter" of two possible solutions, implied by the rise, then fall of angle φ as a function of angle θ. Control achieved by contouring member 1180 yields higher vertical-to-horizontal stiffness ratios than provided by an uncontoured member, and may prove difficult to keep adequately reproducible in production. Greater thicknesses of member 1180 tend to yield the highest ratios of vertical-to-horizontal stiffness.

It should be appreciated that the techniques described above for obtaining the desired plane of accuracy 1154 are provided purely for purposes of example and do not constitute limitations of the present invention. Other techniques for generating the desired plane of accuracy 1154 also fall within the scope of the claims.

In one aspect of the present invention, elastic means are provided below the touch surface in a touch location device including a plurality of force sensors. Sensing connections comprise such elastic means connected in series with the plurality of force sensors. The elastic means contain components that are angled away from the desired plane of accuracy, so as to separately place an elastic center of each sensing connection in the desired plane of accuracy. The reaction to tangential touch force in each sensing connection thus becomes itself purely tangential. The sensing connections are provided with directions of sensitivity perpendicular to the desired plane of accuracy; thus, a purely tangential reaction transported across them produces no output.

Figure 9A:
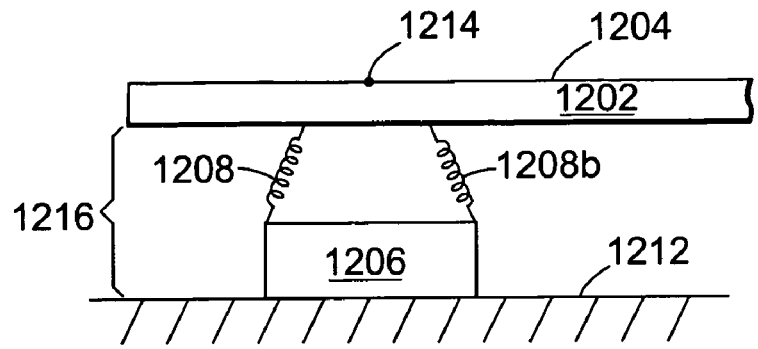
FIGS. 9A–9C are cross-sectional views of touch location devices including sensor assemblies having angled principal stiffnesses according to one embodiment of the present invention.

For example, referring to FIG. 9A, an embodiment is shown including a touch panel 1202 having a touch surface 1204, which is the desired plane of accuracy. Rigid force sensor 1206 is connected in series with elastic means 1208*a* and 1208*b*, which are coupled between sensor 1206 and touch panel 1202. Force sensor 1206 is mounted on a rigid support surface 1212. In conjunction with rigid attachments provided from above and below, force sensor 1206 and elastic means 1208*a–b* collectively comprise sensing connection 1216.

Elastic means 1208*a–b*, in conjunction with rigid structures above and below, provide an embodiment of angled stiffness structure 1300. Elastic means 1208*a–b* are positioned, angled, and provided with stiffness ratios such that the elastic center of sensing connection 1216 is at point 1214, which is within the tolerable zone of offset of the touch surface 1204. As a result, sensor 1206 is insensitive to tangential forces applied to touch surface 1204.

Figure 9B:
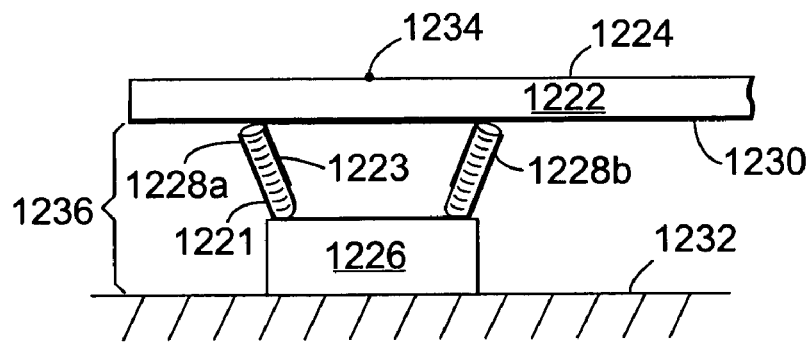

FIG. 9B shows a variation of the arrangement shown in FIG. 9A, in which elastomeric slabs 1228*a–b* are attached between angled surfaces of rigid brackets 1221 and 1223. This illustrates one of the wide range of embodiments of elastic means 1208*a*–*b*, illustrated semi-schematically in FIG. 9A, that will be evident to one of ordinary skill in the art.

Figure 9C:
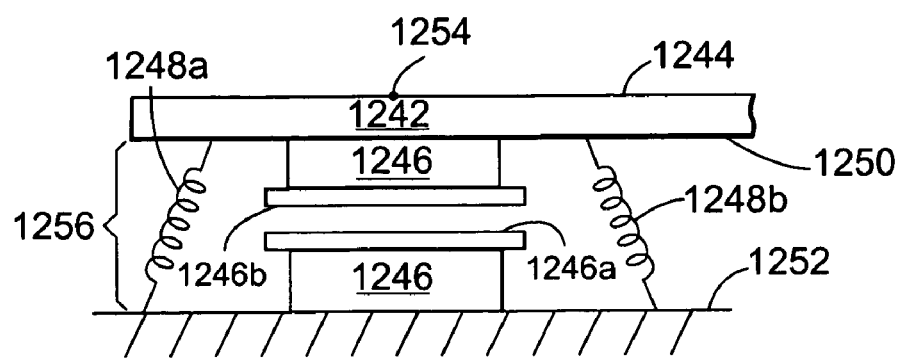

FIG. 9C shows a variation of the arrangement shown in FIG. 9A, in which a displacement sensor 1246 (e.g. capacitive) is connected in parallel with elastic means 1248*a*–*b* (e.g., springs). Both elastic means 1228*a*–*b* and displacement sensor 1246 are coupled above to underside 1250 of touch panel 1242 and below to rigid support surface 1252. In conjunction with rigid attachments provided from above and below, displacement sensor 1246 and elastic means 1248*a*–*b* collectively comprise sensing connection 1256. By reference to angled stiffness structure 1300, we again see how elastic means 1242*a*–*b* may be so designed as to place the elastic center of sensing connection 1256 at point 1254, which is within the tolerable zone of offset of a touch surface 1244 of touch panel 1242. As a result, sensor 1246 is insensitive to tangential forces applied to touch surface 1244.

Although only a single sensor assembly is shown in each of FIGS. 9A–9C, it should be appreciated that several sensor assemblies may be coupled to a single touch panel using the techniques described above with respect to FIGS. 9A–9C, thereby placing the elastic center of each sensing connection within the tolerable zone of offset of the desired surface of accuracy.

The discussion above has been conducted in reference to some elements with idealized rigidity. It is to be appreciated that such elements may exhibit a small, but not insignificant, degree of flexure in a real device. In particular, flexure yielding additionally to moment couples passing through the sensing connection may tend to affect the location of the connection's elastic center, generally tending to lower it in these designs. As long as such flexure is within bounds, however, the desired elastic center may be provided by appropriate further adjustment of the position, obliquity, and stiffness ratios of the elements comprising the elastic means. Such adjustment may be accomplished empirically.

Such adjustments accommodating less than ideal rigidity in the touch surface structure, supporting structure, force sensors, or other elements may be employed in these, and other aspects of the invention described elsewhere herein, and are within the scope of the invention.

In another aspect of the present invention, force sensors or force sensor assemblies in a touch location device are provided having axes of sensitivity that are angled away from both the desired plane of accuracy and from the local touch surface normal (which is sometimes different). The axes of sensitivity are angled so that the lines of action of the reactions passing through the sensing connections in response to tangential forces applied to the touch surface intersect the axes of sensitivity at right angles. As a result, the force sensors yield no response to tangential forces in the desired plane of accuracy.

Figure 6B:
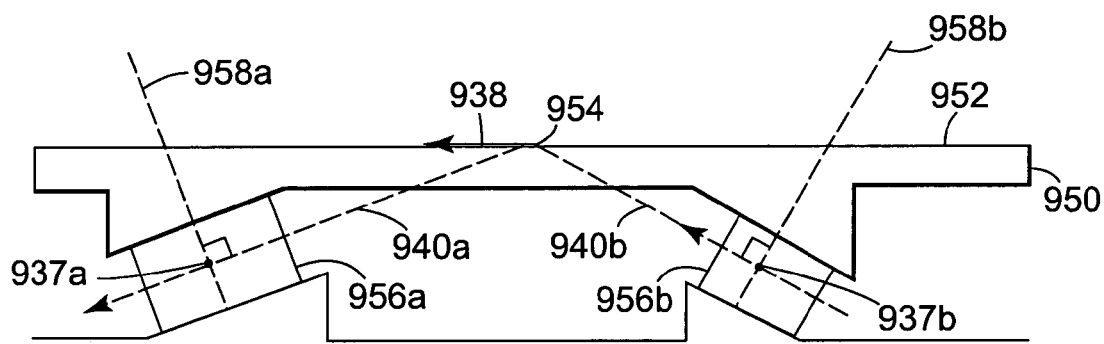
FIG. 6B is a schematic cross-sectional view of a touch location device including angled sensor assemblies according to one embodiment of the present invention.

For example, referring to FIG. 6B, an embodiment is shown in which angled sensor assemblies 956*a*–*b* are used to achieve insensitivity to tangential forces. Touch panel 950 includes a touch surface 952 to which touch forces may be applied. The desired plane of accuracy to be achieved by adjustment of sensor assemblies 956*a*–*b* is therefore coincident with the touch surface 952. Application of tangential force 938 to the center 954 of touch surface 952 creates forces passing through sensor assemblies 956*a*–*b*. In the case that sensor assemblies 956*a*–*b* have substantially lower rotational stiffness than the entire system of panel 950 as mounted, the lines of action 940*a*–*b* of these forces pass near or through the elastic centers 937*a*–*b* of the sensor assemblies, as shown. However, because sensor assemblies 956*a*–*b* have axes of sensitivity 958*a*–*b* that are angled with respect to the touch surface 954, lines of action 940*a*–*b* are perpendicular to axes of sensitivity 958*a*–*b*, respectively. Sensor assemblies 956*a*–*b* therefore yield no response to the tangential force 938 or, as noted before, to any combination of tangential forces and perpendicular moment applied to the touch surface 952.

It is generally desirable for the sensing connections to be rotationally soft in comparison to the touch panel 950, so that unwanted moments are not passed through the sensors in response to touch surface distortions produced by perpendicular touch forces. Such rotational softness may be inherent to the chosen design without special provision; alternatively, a specific rotational softener may be added, such as an elastomeric pad or block; a pivot, hinge, or ball joint; or a spring, or other elastic body. Such constructions may have a clear-cut elastic center through which the connection's line of action passes. Examples of such rotational softeners are provided in the concurrently filed application entitled "Method and Apparatus for Force-Based Touch Input."

Figure 6C:
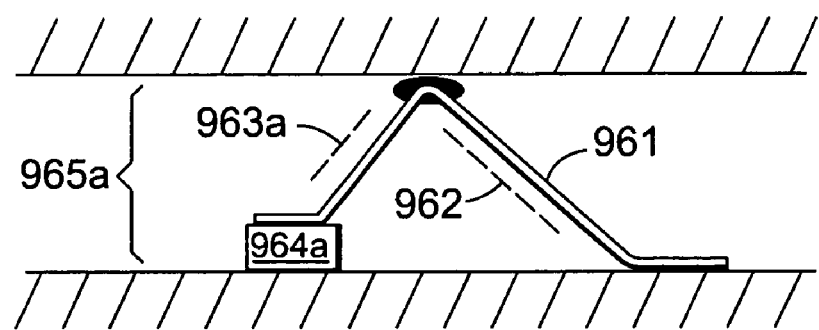
FIGS. 6C–6D are partial schematic cross-sectional views of touch location devices including non-angled sensor assemblies that provide angled axes of sensitivity according to embodiments of the present invention.
Figure 6D:
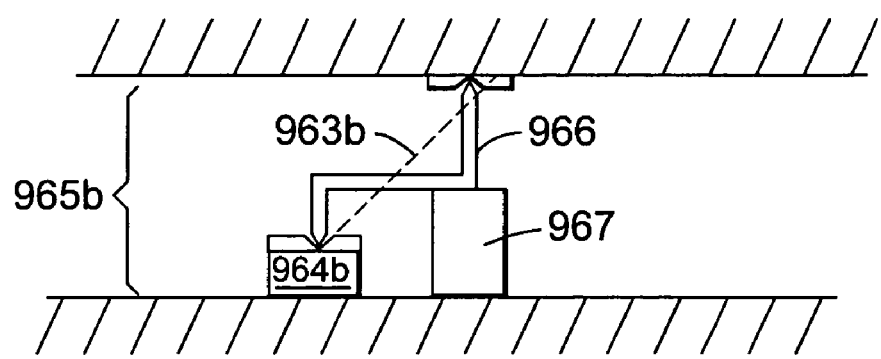

Although entire sensor assemblies 956*a*–*b*, along with, by implication, all components thereof, are angled with respect to the desired surface of accuracy in FIG. 6B, it should be appreciated that this is shown merely for purposes of example and is not a limitation of the present invention. Rather, the axes of sensitivity 955*a*–*b* of the sensor assemblies 956*a*–*b* may be rendered oblique as a property of their construction, without such components as the force sensor itself necessarily being oblique. For example, referring to FIGS. 6C–6D, sensor assemblies 965*a*–*b* have inclined axes of sensitivity parallel to lines 963*a*–*b*, even though sensors 964*a*–*b* have perpendicular axes of sensitivity. Referring to FIG. 6C, slender coupling member 961 of sensor assembly 965*a* can flex transversely to its legs, but does not compress significantly along their lengths. Thus, forces parallel to line 961 do not generate reactions in force sensor 964*a*, forcing the overall axis of sensitivity of sensor assembly 965*a* to lie parallel to line 963*a*. Referring to FIG. 6D, more abstract sensor assembly 965*b* illustrates that an inclined axis of sensitivity may be achieved, absent any inclined components. The pivoted ends of rigid coupling 966 allow force transmission through force sensor 964*b* only along overall axis of sensitivity 963*b* of sensor assembly 965*b*. Small flexures in elastomeric block 967 generate the equilibrium reaction to all components of force perpendicular to axis 963*b*.

Figure 6E:
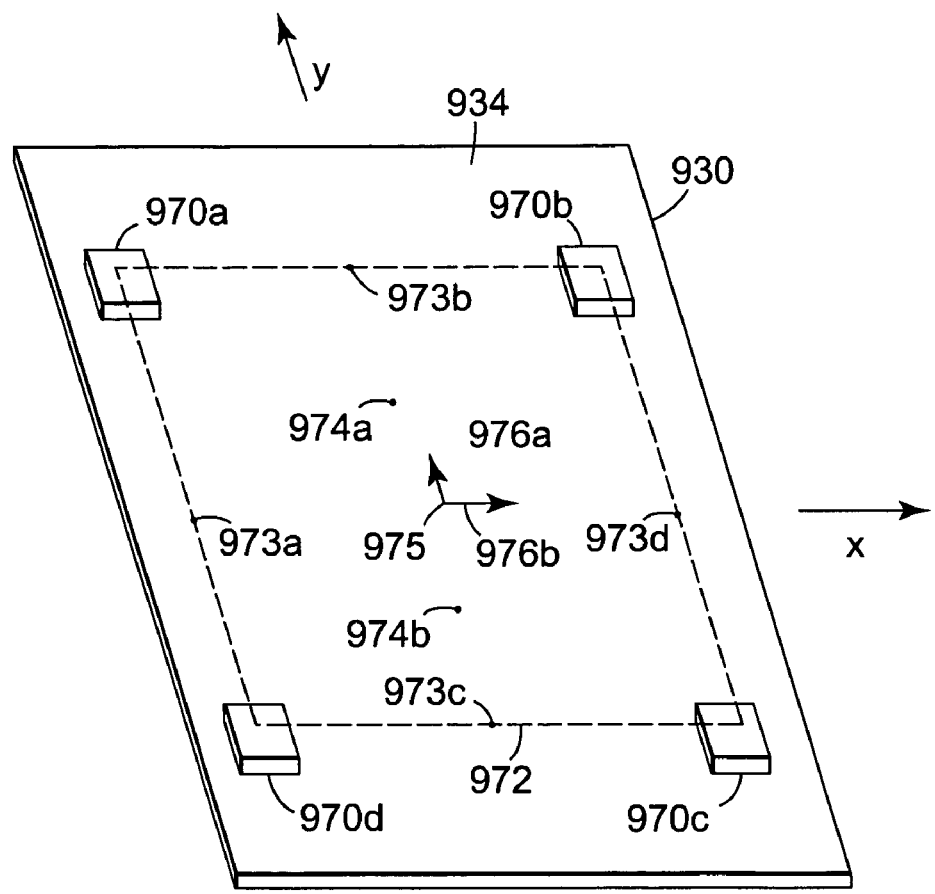
FIG. 6E is a top perspective view of force sensors rearwardly mounted to a touch panel according to one embodiment of the present invention.

The system considered in FIG. 6B may be taken into three dimensions in reference to FIG. 6E, which depicts touch panel 930 of a force-sensing touch location system. Schematically depicted sensing connections 970*a*–*d* are placed beneath panel 930, positioned under the corners of rectangle 972 lying in plane of touch 934. Points 973*a*–*d* lie in touch plane 934, at points midway along the sides of rectangle 972.

FIG. 6B may now be interpreted and applied to the sensing connections 970*a*–*d* for each adjacent pair along a side. For example, sensor assemblies 956*a* and 956*b* may be taken to lie within sensing connections 970*a* and 970*d*, respectively, such that the elastic centers 937*a*–*b* fall under the corresponding corners of rectangle 972. Tangential force 938 may correspond to centrally applied, y-directed tangential force 976*a*, with the separate lines of action of the forces then arising in sensing connections 970*a* and 970*d* then intersecting each other and the touch plane 934 in point 973*a*, corresponding to point 954 of FIG. 6B. It is to be understood that the forces arising in all four sensing connections 970*a–d* in response to force 976*a* lie parallel to the y–z plane (i.e. have no x component), and differ only in the sense of their inclination from the touch plane. The lines of action of the forces passing through connections 970*a* and 970*d* project into the touch plane along the left edge of rectangle 972, and have a resultant with a line of force coincident with the left edge of rectangle 972. The corresponding forces through connections 970*b* and 970*c* likewise have a resultant with a line of action lying along the right edge of rectangle 972. These two pairwise resultants then have a grand resultant equaling force 976*a* (or its opposite, if one prefers to think in terms of reactions) having a line of action centered on the y-axis.

Now it may be seen that by angling the sensor assemblies within each sensing connection outward with respect to both the x and y directions, the situation depicted in FIG. 6B may be simultaneously satisfied for both axes and all four sensing connections. More particularly, the plane of null sensitivity of each sensing connection, which plane lies perpendicular in each case to the connection's axis of sensitivity and contains its elastic center, may be turned to intersect the adjacent pair of midpoints 973*a–d* of rectangle 972, lying in the desired plane of accuracy.

Note that in the particular case shown, where rectangle 972 is not also a square, the axes of sensitivity of sensing connections 970*a* and 970*b* (not shown for ease of illustration) are actually inclined away from point 974*a*, rather than away from center 975. Thus also, the axes of sensitivity of sensing connections 970*d* and 970*c* lie in perpendicular planes containing point 974*b*. It may be instructive also to note that in the non-square case, the arrangement of FIG. 6E generates non-zero sensor output to perpendicularly applied moment, and thus to tangential forces not passing through point 975 (forces not centrally applied). These outputs do, and as may be demonstrated from symmetry must, however, cancel out in the linear combinations forming the representations of x-axis moment, y-axis moment, and z-force used to compute touch location. Thus such embodiments of the invention provide immunity to general tangential force error.

It may also be shown that for a system of three sensors, wherein the analog to locating rectangle 972 is an equilateral triangle, that an analogous intersecting of the midpoints of the sides of that triangle by the planes of null sensitivity of the sensing connections provides immunity to tangential error.

More generally, for any pattern and number of sensors, those to either side of the y-axis may be inclined more-or-less outward in the x direction, a degree of inclination being found empirically that confers immunity to x-directed tangential force. The same sensors regrouped above and below the x-axis may then be provided with additional inclination, this time outward in the y direction, to find a set of angles that also confers immunity to y-directed tangential force. Although the sensors may separately respond in some degree to tangential force, these responses nominally cancel out in computation, and the resulting system may be essentially free of tangential force error in touch location.

The sensor assemblies chosen for use here may be of any desired construction, and so have been shown in generalized form. Those with an easily identified, relatively rotationally soft elastic center or pivot may have known locations of their elastic centers, and so be easier to incorporate in accordance with the non-empirical rules discussed above, but the empirical method may be applied to others. If the sensors employed are very much stiffer across their axis of sensitivity than along it, and are to be substantially inclined, a modest lateral softening may be provided, such that sensitivity to perpendicular touch forces is not lost.

If preload means or lateral restraint means are required, these may be made laterally soft, so that the paths of touch force remain undivided, and pass substantially through the sensing connections. If such shunt paths are of intermediate lateral stiffness, a hybrid design may be found which comprises some degree of sensing inclination, and some degree of lateral stiffening.

It should be appreciated that features of various aspects and embodiments of the invention shown and described herein may be combined in various ways. Such combinations include, but are not limited to, the use of elastic means described above with respect to FIGS. 8A–8B in combination with the use of sensor assemblies having angled axes of sensitivity as described above with respect to FIG. 6B.

It is to be understood that although the invention has been described above in terms of particular embodiments, the foregoing embodiments are provided as illustrative only, and do not limit or define the scope of the invention. Other embodiments are also within the scope of the present invention, which is defined by the scope of the claims below.

What is claimed is:

1. A force sensing touch location device for sensing a touch force applied to a touch surface, the touch force including a perpendicular component that is perpendicular to a surface of accuracy of the touch device and a tangential component that is tangential to said surface of accuracy, the force sensing touch location device comprising:
   a plurality of force sensors that develop signals in response to application of the touch force to the touch surface; and
   a first mechanical path to transmit the majority of the tangential component of the touch force, wherein the first path does not include the plurality of force sensors, and wherein the first path comprises a plurality of shunt connections coupled to the touch surface, the plurality of shunt connections comprising lateral stiffening means for impeding lateral motion of the touch surface.

2. The force sensing touch location device of claim 1, wherein the lateral stiffening means has a plane of substantially zero reaction moment to the tangential component of the touch force, and wherein the plane of substantially zero reaction moment is substantially coincident with the touch surface.

3. The force sensing touch location device of claim 1, wherein the at least one force sensor includes a perpendicular force path that is substantially stiff and wherein the lateral stiffening means includes a perpendicular force path that is substantially soft.

4. The force sensing touch location device of claim 1, wherein the lateral stiffening means comprises a thin member that joins the touch surface to a surrounding frame.

5. The force sensing touch location device of claim 4, wherein the thin member comprises a strip of tape.

6. The force sensing touch location device of claim 4, wherein the thin member bridges a small gap between the touch surface and an edge of the frame.

7. The force sensing touch location device of claim 4, wherein a freely flexing region of the thin member extends a distance beyond an edge of the touch surface.

8. The force sensing touch location device of claim 4, wherein the thin member is constructed of high-modulus material to be substantially stiff to tangential movement of the touch surface and substantially compliant to perpendicular motion of the touch surface.

9. The force sensing touch location device of claim 4, wherein the thin member includes a compliant contour between the touch surface and the frame.

10. The force sensing touch location device of claim 9, wherein the compliant contour is compliant in a direction normal to the touch surface and stiff in a direction parallel to the touch surface.

11. The force sensing touch location device of claim 4, wherein the lateral stiffening means impedes the passage of foreign substances between the touch surface and the frame.

12. The force sensing touch location device of claim 11, wherein the thin member joins the entire circumference of the touch surface to the frame.

13. The force sensing touch location device of claim 1, wherein the touch surface comprises a display surface.

14. The force sensing touch location device of claim 13, wherein the touch surface comprises an LCD.

15. The force sensing touch location device of claim 1, wherein the touch surface comprises a touch overlay overlaying a display surface.

16. The force sensing touch location device of claim 1, wherein force paths passing through the force sensors pass also through lateral softening means for reducing the proportion of the tangentially applied touch force transmitted through the force sensors.

17. The force sensing touch location device of claim 1, further comprising a second mechanical path that comprises lateral softening means for directing the majority of the tangential component of the touch force through the first path.

18. The force sensing touch location device of claim 17, wherein the lateral softening means is disposed between the touch surface and at least one of the plurality of force sensors.

19. The force sensing touch location device of claim 17, wherein the lateral softening means comprises a columnar structure.

20. The force sensing touch location device of claim 19, wherein the columnar structure comprises a portion of a diffuser including a boss contacting the at least one force sensor.

21. The force sensing touch location device of claim 18, wherein the lateral softening means comprises an elastomer.

22. The force sensing touch location device of claim 21, wherein the lateral softening means comprises a disk of tape backed by a soft adhesive.

23. A force sensing touch location device for sensing a touch force applied to a touch surface, the force sensing touch location device comprising:
  a plurality of force sensors that develop signals in response to application of the touch force to the touch surface; and
  a first mechanical path comprising a plurality of shunt connections coupled to the touch surface to transmit the majority of the touch force, wherein the first path does not include the plurality of force sensors, wherein the plurality of shunt connections comprise lateral stiffening means for impeding lateral motion of the touch surface.

24. The force sensing touch location device of claim 23, wherein the lateral stiffening means has a plane of substantially zero reaction moment to the tangential component of the touch force, and wherein the plane of substantially zero reaction moment is substantially coincident with the touch surface.

25. The force sensing touch location device of claim 23, wherein the touch surface comprises a display surface.

26. The force sensing touch location device of claim 25, wherein the touch surface comprises an LCD.

27. The force sensing touch location device of claim 23, wherein the touch surface comprises a touch overlay overlaying a display surface.

28. A force sensing touch location device for sensing a touch force applied to a touch surface, the touch force including a perpendicular component that is perpendicular to a surface of accuracy of the touch device and a tangential component that is tangential to said surface of accuracy, the force sensing touch location device comprising:
  a plurality of sensors that develop signals in response to application of the touch force to the touch surface;
  at least one sensing connection coupled between the plurality of sensors and the touch surface, the at least one sensing connection developing a corresponding reaction force to the tangential component of the touch force, the at least one sensing connection having an axis at sensitivity that is substantially perpendicular to the corresponding reaction force and oblique with respect to a normal to the touch surface; and
  a plurality of elastic means, coupled between the touch surface and at least one connecting surface, for positioning the elastic center of the at least one sensing connection substantially within the surface of accuracy.

29. The force sensing touch location device of claim 28, wherein each of the plurality of elastic means is coupled between the touch surface and a surface of one of the plurality of sensors.

30. The force sensing touch location device of claim 28, wherein the force sensing touch location device further comprises a rigid support surface in contact with the plurality of sensors, wherein the at least one sensing connection comprises a plurality of sensing connections, wherein the connecting surface comprises the rigid support surface, and wherein the elastic center of each of the plurality of sensing connections is located substantially within the surface of accuracy.

31. The force sensing touch location device of claim 28, wherein the force sensing touch location device further comprises a rigid support surface in contact with the plurality of sensors, wherein the connecting surface comprises the rigid support surface, and wherein an overall elastic center of the plurality of sensing connections is located substantially within the plane of accuracy.

32. The force sensing touch location device of claim 28, wherein the elastic means comprises a first elastic portion and a second elastic portion meeting at an inflection point substantially within the surface of accuracy, whereby the elastic center of the at least one sensor connection is positioned substantially within the surface of accuracy.

33. The force sensing touch location device of claim 28, wherein the at least one sensing connection comprises a plurality of sensing connections, and wherein the plurality of elastic means comprise elements that have principal axes of stiffness that are oblique with respect to the surface of accuracy, thereby positioning the elastic center of each of the plurality of sensing connections substantially within the surface of accuracy.

34. The force sensing touch location device of claim 28, wherein the at least one sensing connection comprises one sensing connection, and wherein the plurality of elastic means have principal axes of stiffness that are oblique with respect to the surface of accuracy, thereby positioning the elastic center of the one sensing connection substantially within the surface of accuracy.

35. A force sensing touch location device for sensing a touch force applied to a touch surface, the touch force including a perpendicular component that is perpendicular to a surface of accuracy of the touch device and a tangential component that is tangential to said surface of accuracy, the force sensing touch location device comprising:
- a plurality of sensors that develop signals in response to application of the touch force to the touch surface;
- at least one sensing connection coupled between the plurality of sensors and the touch surface, the at least one sensing connection developing a corresponding reaction force to the tangential component of the touch force, the at least one sensing connection having an axis of sensitivity that is substantially perpendicular to the corresponding reaction force;
- a plurality of elastic means, coupled between the touch surface and at least one connecting surface, the plurality of elastic means including components that are oblique with respect to the surface of accuracy, whereby the elastic center of the at least one sensing connection is positioned substantially within the surface of accuracy.

36. The force sensing touch location device of claim 35, wherein the plurality of sensors comprise a plurality of force sensors.

37. The force sensing touch location device of claim 35, wherein the plurality of sensors comprise a plurality of displacement sensors.

38. The force sensing touch location device of claim 35, wherein the axis of sensitivity of the at least one sensing connection is oblique with respect to a normal to the touch surface.

39. The force sensing touch location device of claim 38, wherein each of the plurality of elastic means is coupled between the touch surface and a surface of one of the plurality of sensors.

40. The force sensing touch location device of claim 38, wherein the force sensing touch location device further comprises a rigid support surface in contact with the plurality of sensors, wherein the at least one sensing connection comprises a plurality of sensing connections, wherein the connecting surface comprises the rigid support surface, and wherein the elastic center of each of the plurality of sensing connections is located substantially within the surface of accuracy.

41. The force sensing touch location device of claim 38, wherein the force sensing touch location device further comprises a rigid support surface in contact with the plurality of sensors, wherein the connecting surface comprises the rigid support surface, and wherein an overall elastic center of the plurality of sensing connections is located substantially within the plane of accuracy.

42. The force sensing touch location device of claim 38, wherein the elastic means comprises a first elastic portion and a second elastic portion meeting at an inflection point substantially within the surface of accuracy, whereby the elastic center of the at least one sensor connection is positioned substantially within the surface of accuracy.

43. The force sensing touch location device of claim 38, wherein the at least one sensing connection comprises a plurality of sensing connections, and wherein the plurality of elastic means comprise elements that have principal axes of stiffness that are oblique with respect to the surface of accuracy, thereby positioning the elastic center of each of the plurality of sensing connections substantially within the surface of accuracy.

44. The force sensing touch location device of claim 38, wherein the at least one sensing connection comprises one sensing connection, and wherein the plurality of elastic means have principal axes of stiffness that are oblique with respect to the surface of accuracy, thereby positioning the elastic center of the one sensing connection substantially within the surface of accuracy.

* * * * *

UNITED STATES PATENT AND TRADEMARK OFFICE
CERTIFICATE OF CORRECTION

| | |
|---|---|
| PATENT NO. | : 7,183,948 B2 |
| APPLICATION NO. | : 09/835049 |
| DATED | : February 27, 2007 |
| INVENTOR(S) | : Jerry B. Roberts |

It is certified that error appears in the above-identified patent and that said Letters Patent is hereby corrected as shown below:

Column 22,
Line 33, after "FIG." delete "1A." and insert -- 10A. --, therefor.

Column 28,
Line 28, Delete "955a–b" and insert -- 958a–b --, therefor.

Column 32,
Line 19, in Claim 28, before "sensitivity" delete "at" and insert -- of --, therefor.

Signed and Sealed this

Twenty-sixth Day of June, 2007

JON W. DUDAS
*Director of the United States Patent and Trademark Office*